United States Patent
Lindskog

(10) Patent No.: US 11,496,384 B2
(45) Date of Patent: Nov. 8, 2022

(54) SYSTEM AND METHOD FOR PHASE SHIFT BASED TIME OF ARRIVAL (TOA) REPORTING IN PASSIVE LOCATION RANGING

(71) Applicant: Samsung Electronics Co., Ltd., Gyeonggi-do (KR)

(72) Inventor: Erik D. Lindskog, Cupertino, CA (US)

(73) Assignee: Samsung Electronics Co., Ltd

( * ) Notice: Subject to any disclaimer, the term of this patent is extended or adjusted under 35 U.S.C. 154(b) by 393 days.

(21) Appl. No.: 16/698,028

(22) Filed: Nov. 27, 2019

(65) Prior Publication Data
US 2020/0191979 A1    Jun. 18, 2020

Related U.S. Application Data

(60) Provisional application No. 62/778,806, filed on Dec. 12, 2018, provisional application No. 62/805,768, filed on Feb. 14, 2019, provisional application No. 62/895,788, filed on Sep. 4, 2019, provisional application No. 62/905,994, filed on Sep. 25, 2019.

(51) Int. Cl.
*H04L 43/106* (2022.01)
*G01S 5/06* (2006.01)
*H04J 3/06* (2006.01)
*G01S 5/10* (2006.01)
*H04L 43/0864* (2022.01)

(52) U.S. Cl.
CPC ............. *H04L 43/106* (2013.01); *G01S 5/06* (2013.01); *G01S 5/10* (2013.01); *H04J 3/0682* (2013.01); *H04L 43/0864* (2013.01)

(58) Field of Classification Search
CPC ..... G01S 5/10; H04L 43/0864; H04L 43/106; H04J 3/0682
See application file for complete search history.

(56) References Cited

U.S. PATENT DOCUMENTS 7,899,006 B2    3/2011    Boyd
8,018,383 B1    9/2011    Schantz et al.
(Continued)

FOREIGN PATENT DOCUMENTS

WO    WO-2018102247 A2 *    6/2018    ............... G01S 5/02

OTHER PUBLICATIONS

Eric Lindskog et al., "Scalable Location Protocol", IEEE 802.11-17/1269r1, XP068116837, Aug. 30, 2017, 35 pages.
(Continued)

*Primary Examiner* — Bernarr E Gregory
*Assistant Examiner* — Fred H Mull
(74) *Attorney, Agent, or Firm* — The Farrell Law Firm, P.C.

(57) ABSTRACT

A method and system for phase shift based time of arrival (TOA) reporting in passive location ranging is herein provided. According to one embodiment, a method includes measuring, by a responder station (RSTA), a first phase shift time of arrival (PS-TOA); measuring, by an initiator station (ISTA), a second PS-TOA; reporting, by the RSTA, the first PS-TOA, reporting, by the ISTA, the second PS-TOA; broadcasting, by the RSTA, time stamps; and determining, by a passive station (PSTA), a differential distance between the PSTA and a pair of the RSTA and ISTA based on the first PS-TOA, the second PS-TOA, and the broadcast time stamps.

13 Claims, 20 Drawing Sheets

(56) References Cited

U.S. PATENT DOCUMENTS

| | | | |
|---|---|---|---|
| 9,538,493 | B2 | 1/2017 | Dupray et al. |
| 10,158,443 | B1 | 12/2018 | Berger et al. |
| 10,228,438 | B2 | 3/2019 | Van Puijenbroek |
| 2014/0045522 | A1 | 2/2014 | Sugar et al. |
| 2019/0033420 | A1 | 1/2019 | Knaappila |
| 2019/0162843 | A1* | 5/2019 | Jiang .................. G01S 5/14 |

OTHER PUBLICATIONS

Liu Qi et al., "Research and Development of Indoor Positioning", China Communications, XP011639761, Feb. 12, 2016, 13 pages.

European Search Report dated May 18, 2020 issued in counterpart application No. 19215391.4-1206, 16 pages.

Christian Berger et al., "Phase-Roll Based ToA for Low Complexity Devices and Immediate Feedback", IEEE 802.11-18/1996r0, Nov. 12, 2018, 16 pages.

Yue Wang et al., "Improving Ranging Accuracy of Active and Passive Anchors in the Presence of Clock Imperfection", Positioning Navigation & Communication, Mar. 20, 2013, 5pgs.

European Search Report dated Nov. 2, 2020 issued in counterpart application No. 19215391.4-1206, 19 pages.

"Client Positioning using Timing Measurements between Access Points", Erik Lindskog et al., IEEE 802.11-13/0072r1, Jan. 15, 2013, pp. 13.

"A Low Overhead Receive Only Wi-Fi Based Location Mechanism", Erik Lindskog, Hong Wan, Raja Banerjea, Naveen Kakani and Dave Huntingford, Proceedings . . . of the 27th International Technical Meeting of The Satellite Division of the Institute of Navigation (ION GNSS+ 2014), Tampa, Florida, Sep. 2014, pp. 1661-1668.

"Passive Location", Erik Lindskog, Naveen Kakani and Ali Raissinia, IEEE 802.11-17/0417r0, Mar. 14, 2017, pp. 30.

"High-Accuracy Indoor Geolocation using Collaborative Time of Arrival (CToA)—Whitepaper", Leor Banin, Ofer Bar Shalom, Nir Dvorecki, Yuval Amizur, . . . IEEE 802.11-17/1387r0, 2017, pp. 14.

"Collaborative Time of Arrival (CToA)", Ofer Bar Shalom, Yuval Amizur, Leor Bani, IEEE 802.11-17/1308r0, Sep. 10, 2017, pp. 38.

"CToA Protocol Analysis", Ofer-Bar Shalom, Yuval Amizur, Leor Banin and Nir Dvorecki, IEEE 802.11-17/1309r0, Sep. 10, 2017, pp. 27.

"Phase-Roll Based ToA for Low Complexity Devices and Immediate Feedback", Christian Berger, Niranjan Grandhe and Liwen Chu in IEEE standards contribution document . . . IEEE 802.11-18/1996r0, Nov. 12, 2018, pp. 16.

"CR for Passive Location", Erik Lindskog, IEEE 802.11-18/1936r2, Nov. 15, 2018, pp. 26.

"Further Scalable Location Performance Analysis", Erik Lindskog, Ali Raissinia and Naveen Kakani, IEEE 802.11-17/1758r0, Nov. 8, 2017, pp. 29.

"LMR and LCI Reporting for Passive Location", Erik Lindskog and Ali Raissinia, IEEE 802.11-18/1629r0, Sep. 12, 2018, pp. 11.

"CIDs 46, 47, 48 Regarding Fine Timing Measurement", 11-12/1249r4, Carlos Aldana (Qualcomm) et al., Nov. 13, 2012, pp. 17.

"P802.11az™/D0.5", the 802.11az amendment text draft version 0.5., Dec. 2017, pp. 4305.

* cited by examiner

US 11,496,384 B2

SYSTEM AND METHOD FOR PHASE SHIFT BASED TIME OF ARRIVAL (TOA) REPORTING IN PASSIVE LOCATION RANGING

PRIORITY

This application is based on and claims priority under 35 U.S.C. § 119(e) to U.S. Provisional Patent Application filed on Dec. 12, 2018 in the United States Patent and Trademark Office and assigned Ser. No. 62/778,806, U.S. Provisional Patent Application filed on Feb. 14, 2019 in the United States Patent and Trademark Office and assigned Ser. No. 62/805,768, U.S. Provisional Patent Application filed on Sep. 4, 2019 in the United States Patent and Trademark Office and assigned Ser. No. 62/895,788, and U.S. Provisional Patent Application filed on Sep. 25, 2019 in the United States Patent and Trademark Office and assigned Ser. No. 62/905,994, the entire contents of which are incorporated herein by reference.

FIELD

The present disclosure is generally related to wireless communication systems. In particular, the present disclosure is related to a system and method for phase shift (PS) based time of arrival (TOA) reporting in passive location ranging.

BACKGROUND

A Wi-Fi positioning system is a geolocation system using the characteristics of nearby Wi-Fi hotspots and other wireless access points to determine a location of a device, for example an indoor positioning system. The indoor positioning system may use various types of ranging protocol, including a non-trigger based (non-TB) ranging protocol, a TB ranging protocol, and a passive location ranging protocol.

SUMMARY

According to one embodiment, a method includes measuring, by a responder station (RSTA), a first phase shift time of arrival (PS-TOA); measuring, by an initiator station (ISTA), a second PS-TOA; reporting, by the RSTA, the first PS-TOA; reporting, by the ISTA, the second PS-TOA; broadcasting, by the RSTA, time stamps; and determining, by a passive station (PSTA), a differential distance between the PSTA and a pair of the RSTA and ISTA based on the first PS-TOA, the second PS-TOA, and the broadcast time stamps.

According to one embodiment, a system includes an RSTA, an ISTA, the RSTA and ISTA configured as a pair, a PSTA, a memory and a processor configured to measure, by the RSTA, a first PS-TOA; measure, by the ISTA, a second PS-TOA; report, by the RSTA, the first PS-TOA; report, by the ISTA, the second PS-TOA; broadcast, by the RSTA, time stamps; and determine, by the PSTA, a differential distance between the PSTA and the RSTA-ISTA pair based on the first PS-TOA, the second PS-TOA, and the broadcast time stamps.

According to one embodiment, a method includes receiving, by a first station (STA), a PS-TOA, calculating, by the first STA, corrected data of the received PS-TOA, wherein the corrected data includes one or more of a corrected PS-TOA and a correction to the PS-TOA, transmitting, by the first STA, the corrected data further comprising performing, by the first STA, one or more of (a) reporting the corrected data to a second STA, and (b) broadcasting the corrected data, and determining a differential distance from a PSTA to the first STA and the second STA based on the corrected data.

According to one embodiment, a system includes a first STA, where the first STA receives a PS-TOA, calculates corrected data of the received PS-TOA, wherein the corrected data includes one or more of a corrected PS-TOA and a correction to the PS-TOA, and transmits the corrected data further comprising performing one or more of (a) reporting the corrected data to a second STA, and (b) broadcasting the corrected data. The system includes a PSTA that determines a differential distance from the PSTA to the first STA and the second STA based on the corrected data.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
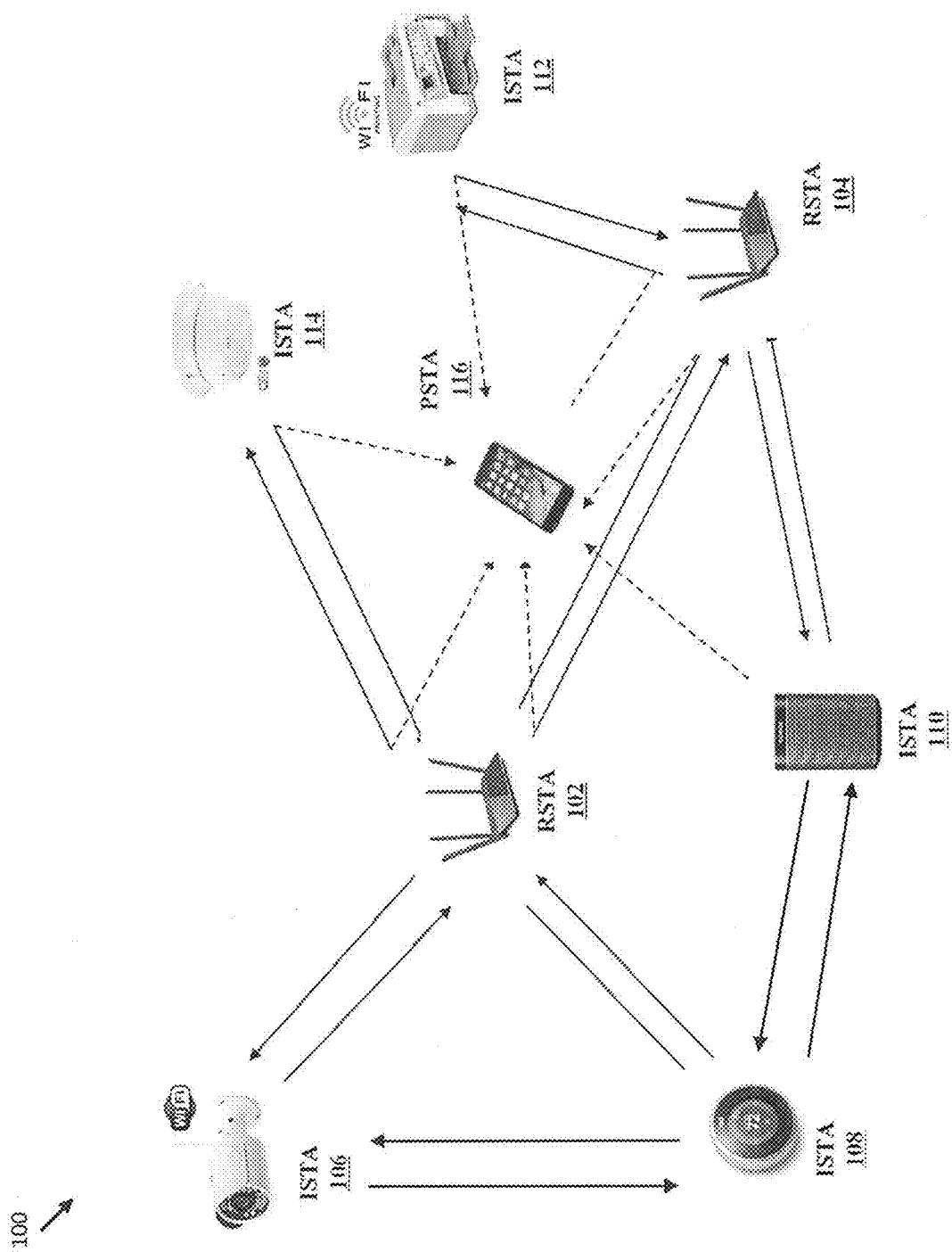
FIG. 1 illustrates a wireless network environment, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to one embodiment, one or more ISTAs participating in a passive location ranging exchange measures phase shift based TOAs instead of measuring TOAs. Instead of both modems in a Wi-Fi ranging exchange measure the TOA of the ranging measurement packets (null data packets (NDPs)), an ISTA determines a TOA measure based on the average phase shift in the channel estimate of the received NDP packet and provides the TOA measurement back to a RSTA. Typically, the ISTA is a client Wi-Fi modem (e.g., a mobile device) while the RSTA is a Wi-Fi access point. The responder may use the phase shift based TOA fed back by the ISTA together with an assumption of reciprocity of the wireless channel to calculate a corrected TOA estimate (of the first tap) for the ISTA. An advantage of this method is that there is a reduction in calculation complexity that the client Wi-Fi modem has to perform. Apart from reducing the work load of the client, the client is also likely to be able to feed back its phase shift measurement immediately as this is a calculation that most modems perform. This can reduce the latency in the ranging measurements.

According to one embodiment, the present system and method is applied to the passive location ranging protocol. In one embodiment, the phase shift based TOA from the ISTAs is applied to the passive location ranging protocol. The present system allows the RSTA to adjust the phase shift based TOA it receives from the ISTA and report a TOA that reflects the ISTA's actual TOA (for the ISTA's first tap). This allows a client station to determine its location while only listening to transmissions between anchor stations.

The RSTA calculates the ISTAs' actual TOAs based on the reported phase shift based TOAs and the assumption of reciprocity of the wireless channel. The time stamps (i.e., the phase shift based TOAs and time of departures (TODs)) are reported to the RSTA that then broadcasts them with the phase shift based TOAs corrected to reflect the actual TOAs of the ISTAs together with the responders own NDP TOD and the RSTAs' TOA estimates for the ISTAs' NDPs, for the benefit of the PSTAs (as well as the initiator stations). The PSTAs use the time-stamps broadcast from the RSTA along with its own TOA time stamps for the reception of the NDP from the RSTA and ISTAs to calculate its differential time-of-flight (TOF) to pairs of stations in the set of RSTA and ISTAs. Differential distance and differential TOF are more or less equivalent, only differing by a factor of the speed of light. With these differential TOFs and knowledge of the location of the RSTA and ISTA, the PSTA can estimate its location.

The phase shift based TOAs may be reported by the stations in place of their regular TOAs. A corrected TOA may be reported by the RSTA. From the RSTA, this corrected TOA can be reported in the Secundus RSTA Broadcast Passive Location Measurement Report frame.

Because of the specific sequencing of the time-stamp reporting frames in the TB ranging, with phase shift based TOA reporting, it is possible to perform the measurements and the reporting within one ranging measurement and reporting sequence (i.e., a ranging opportunity). In the case of phase shift based TOA reporting applied to TB-ranging, it is necessary to report the corrected TOAs for the initiators in a later occurring TB-ranging opportunity, or to modify the sequence in the standard which may not be desired. On the other hand, when the phase shift based TOA measurements by the ISTAs are applied to the passive location ranging protocol, the corrected TOAs for the ISTAs can be fed back in the Secundus RSTA Broadcast Passive Location Measurement Report frame. Thus, in the passive location ranging case, as long as the ISTAs feed back their phase shift based TOAs in the same ranging opportunity in which they are measured and the RSTA calculates the corrected TOAs for the ISTAs in time to feed them back in the Secundus RSTA Broadcast Passive Location Measurement Report frame, then all the measurements and reporting can be achieved within one ranging opportunity. The responder may very well be capable to do this as the RSTA may have either specialized circuitry to do these calculations quickly, or simply may have sufficient firmware and/or software capabilities. Containing the measurements and the reporting in one ranging opportunity is very helpful for the PSTAs. In this case, a PSTA may gather all the information needed for an estimation of its location, or an estimation of its location constrained to one or more hyperbolic curves from only capturing the transmissions in a single passive location ranging opportunity. The main advantage is that the PSTA does not have to return to a subsequent passive location ranging opportunity to obtain the missing time-stamp information.

FIG. 1 illustrates a wireless network environment, according to an embodiment. The environment 100 includes access points or RSTAs 102 and 104, various devices as anchor clients or ISTAs 106, 108, 110, 112, and 114, as well as a PSTA 116. The RSTAs 102 and 104 and the ISTAs 106, 108, 110, 112 and 114 transmit and receive information between each other, while the PSTA 116 can passively determine a differential distance between the PSTA 116 and an RSTA-ISTA pair based on observations from the information being transmitted between the RSTAs 102 and 104 and the ISTAs 106, 108, 110, 112 and 114.

According to one embodiment, the present system and method includes receiving, by an RSTA, a PS-TOA from an ISTA, determining, by the RSTA, an actual TOA for the ISTA based on its PS-TOA and the assumption of the reciprocity of the wireless channel between the RSTA and the ISTA, receiving, by the PSTA, the ISTA's actual TOA from the RSTA, receiving, by a PSTA, the ISTA's TOD from the RSTA, receiving, by the PSTA, the RSTA's TOD and TOA from the RSTA, measuring, by the PSTA, the TOA of the ranging measurement frames transmitted by the ISTA and the RSTA, and determining, by the PSTA, a differential TOF to the RSTA and ISTA pair.

Figure 2:
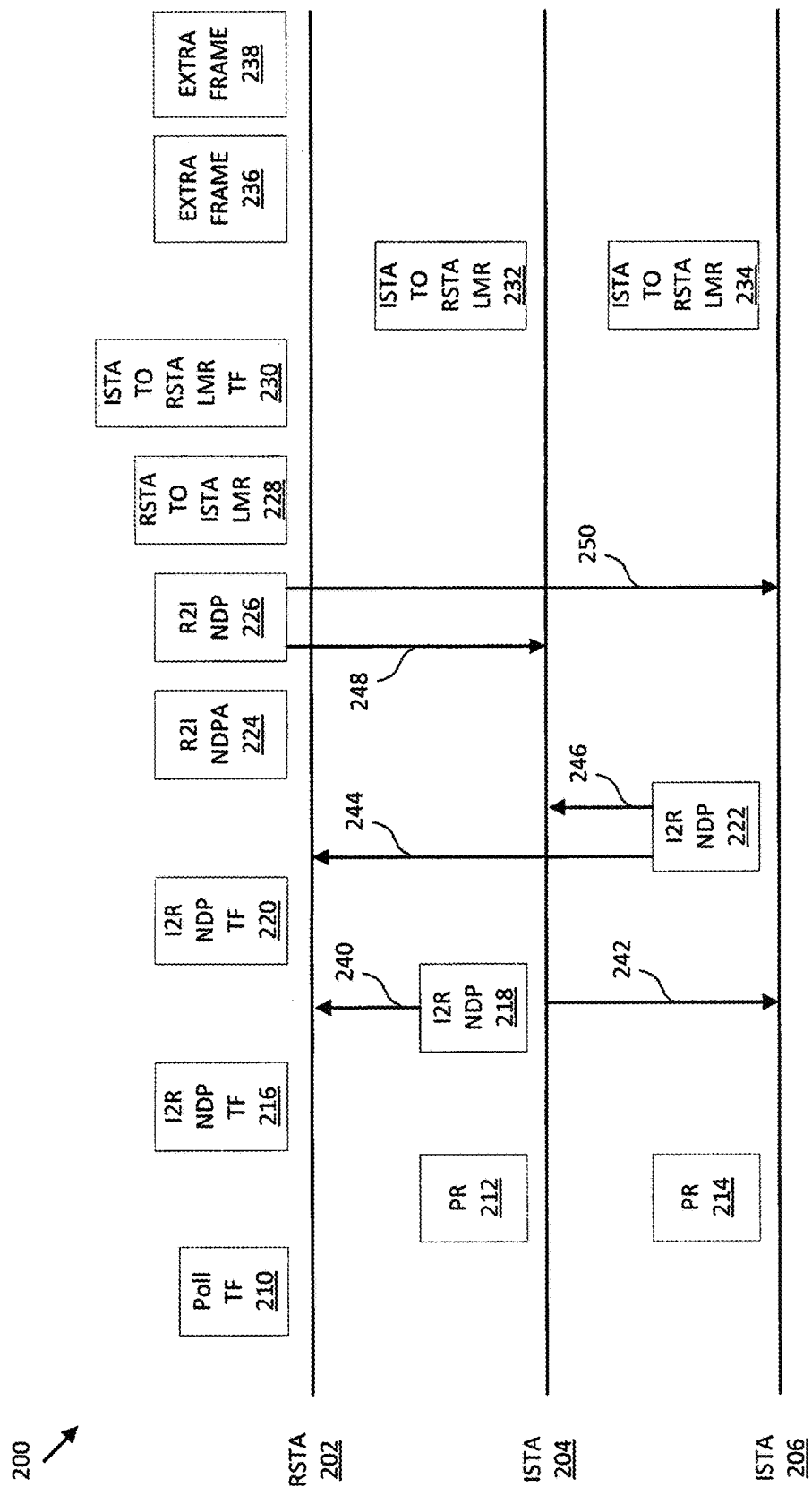
FIG. 2 illustrates frames in a TB ranging protocol, according to an embodiment.

FIG. 2 illustrates frames in a TB ranging protocol, according to an embodiment. The TB ranging protocol 200 includes frames in a system with an RSTA 202, a first ISTA 204 and a second ISTA 206. The RSTA 202 transmits a poll trigger frame (TF) 210 and the ISTAs 204 and 206 generate a first poll response (PR) 212 and a second PR 214, respectively. Then, the RSTA 202 transmits an uplink (UL) NDP TF 216 for the first ISTA 204, and the first ISTA 204 transmits the I2R NDP 218. Then, the RSTA 202 transmits an uplink (UL) NDP TF 220 for the second ISTA 206, and the second ISTA 206 transmits the I2R NDP 222. The RSTA 202 then generates a downlink (DL) null data packet announcement (NDPA) frame 224 and transmits a R2I NDP 226 to the ISTAs 204 and 206. The RSTA 202 generates an RSTA to ISTA location measurement report (LMR) 228 and generates an ISTA to RSTA LMR TF 230. The first ISTA 204 generates an ISTA to RSTA LMR 232 and the second ISTA 206 generates an ISTA to RSTA LMR 234. The protocol 200 includes two extra frames 236 and 238 (e.g., a Primus RSTA Broadcast Location Measurement Report frame and a Secundus RSTA Broadcast Passive Location Measurement Report frame) for passive location ranging. The arrows 240, 242, 244, 246, 248 and 250 indicate listening opportunities for passive location ranging.

Figure 3:
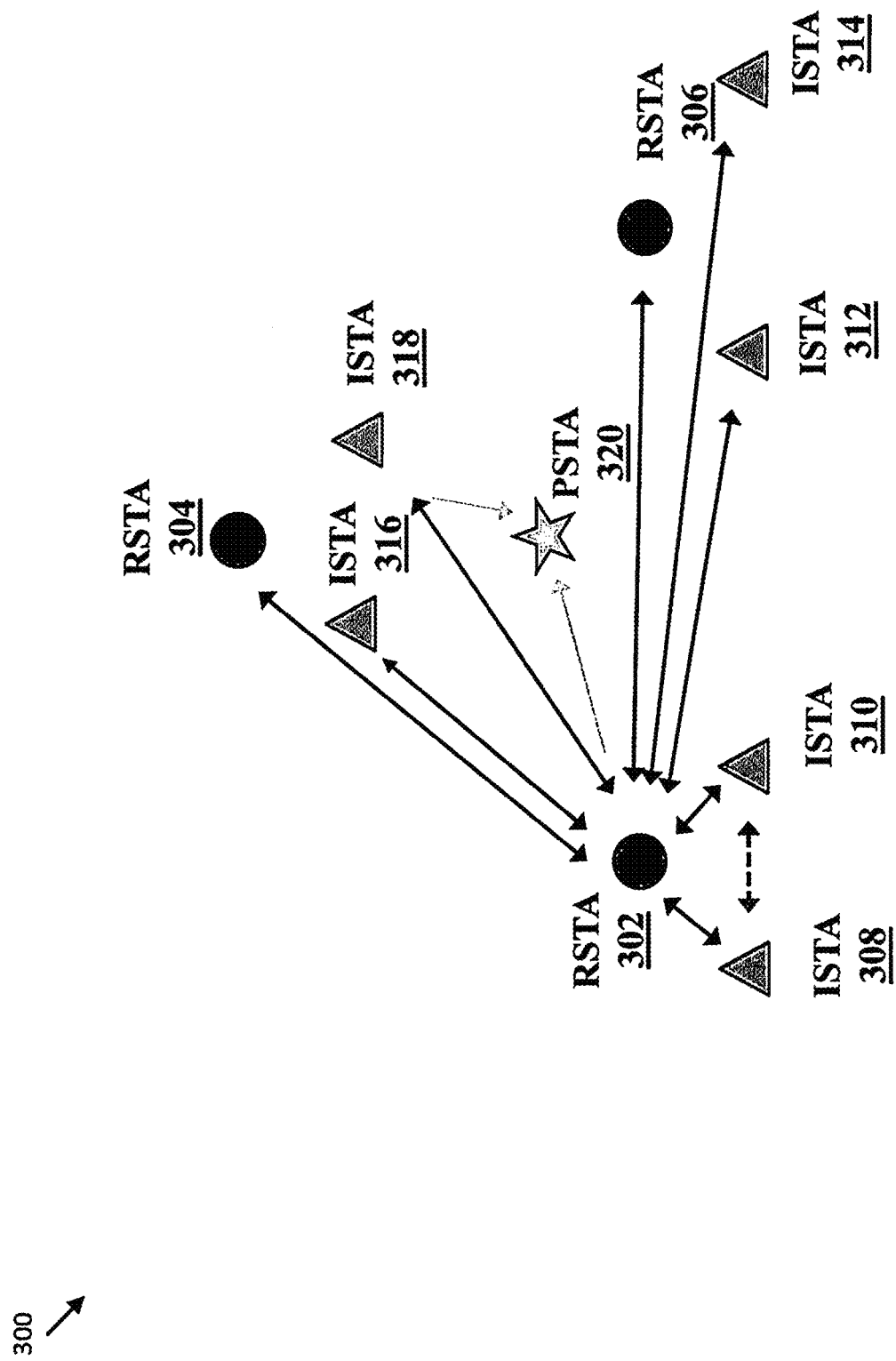
FIG. 3 illustrates a diagram of a wireless network environment, according to an embodiment.

FIG. 3 illustrates a diagram of a wireless network environment, according to an embodiment. The environment 300 includes RSTAs 302, 304 and 306, ISTAs 308, 310, 312, 314, 316 and 318, and a PSTA 320. The arrows indicate exchanges and, although not all exchanges are shown, in general they occur between any RSTA/ISTA and ISTA/ISTA pair. The RSTAs 302, 304 and 306 are assumed to operate on different channels. The PSTA 320 can also switch channels and listen to the corresponding ranging on each neighboring RSTAs' 302, 304 and 306 channel. With scheduled TB ranging opportunities, all the neighboring RSTAs and ISTAs anchor client stations can appear on the same channel all at the same time, which allows a very large number of ranging exchanges. Further, if the PSTA 320 client to be located also switches channels, it can listen to an even larger set of ranging exchanges, namely one such set in each RSTAs 302, 304 and 306 channels.

Figure 4:
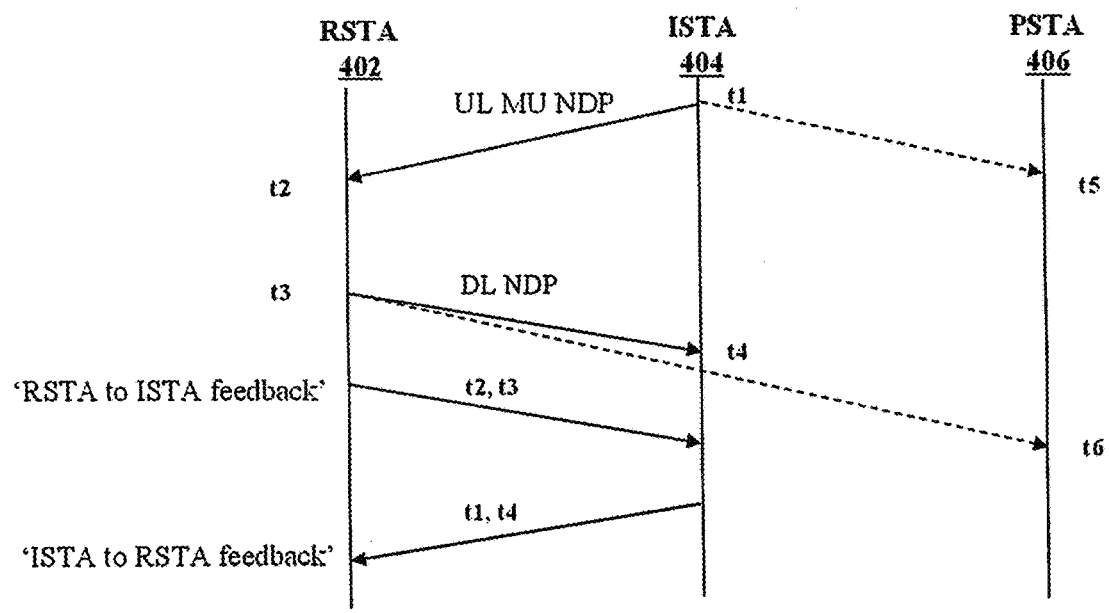
FIG. 4 illustrates a diagram of propagation paths and time stamps in a wireless network environment, according to an embodiment.

FIG. 4 illustrates a diagram of propagation paths and time stamps in a wireless network environment, according to an embodiment. The environment 400 includes an RSTA 402, and ISTA 404 and a PSTA 406. At t1 (e.g., actual TOD), the ISTA 404 transmits the I2R NDP and at t2, the RSTA 402 receives the I2R NDP. At t3, the RSTA 402 transmits the R2I NDP to the ISTA 404, and at t4, the ISTA 404 receives the R2I NDP. The RSTA to ISTA feedback frame is transmitted from the RSTA 402 to the ISTA 404 which provides the times t2 and t3 to the ISTA 404. The ISTA transmits the ISTA to RSTA feedback frame to the RSTA 402 which provides the times t1 and t4 to the RSTA 402. The PSTA 406 listens to the transmissions between the ISTA 404 and the RSTA 402 to obtain t5 and t6.

The PSTA 406 listens to the exchanges between the RSTA 402 and the ISTA 404 and records the time t5 when it receives the I2R NDP from the ISTA 404 and the time t6 when it receives the R2I NDP from the RSTA 402. The PSTA 406 also listens to the relayed t2 and t3 from the RSTA 402 and the relayed t1 and t4 in the feedback frame from the ISTA 404. The differential distance between the PSTA 406 and the RSTA 402 versus the ISTA 404 is calculated as in Equation (1):

$$DD\_PIR = [t6 - t5 - (t3 - t2 + T\_IR)] * c \quad (1)$$

where c is the speed of light. Using Equation (2):

$$T\_IR = [(t4-t1)-(t3-t2)]/2 \qquad (2)$$

Equation (3) can be derived as:

$$DD\_PIR = [t6-t5-(t3-t2+0.5*t4-0.5*t1-0.5*t3+0.5*t2)]*c \qquad (3)$$

or, as in Equation (4).

$$DD\_PIR = [t6-t5-0.5*t3+0.5*t2-0.5*t4+0.5*t1]*c \qquad (4)$$

Equation (4) does not depend on the TOF, T_IR between the RSTA 402 and the ISTA 404. Thus, this method of calculating the DD_PIR is insensitive to LOS obstructions between the RSTA 402 and the ISTA 404.

Figure 5:
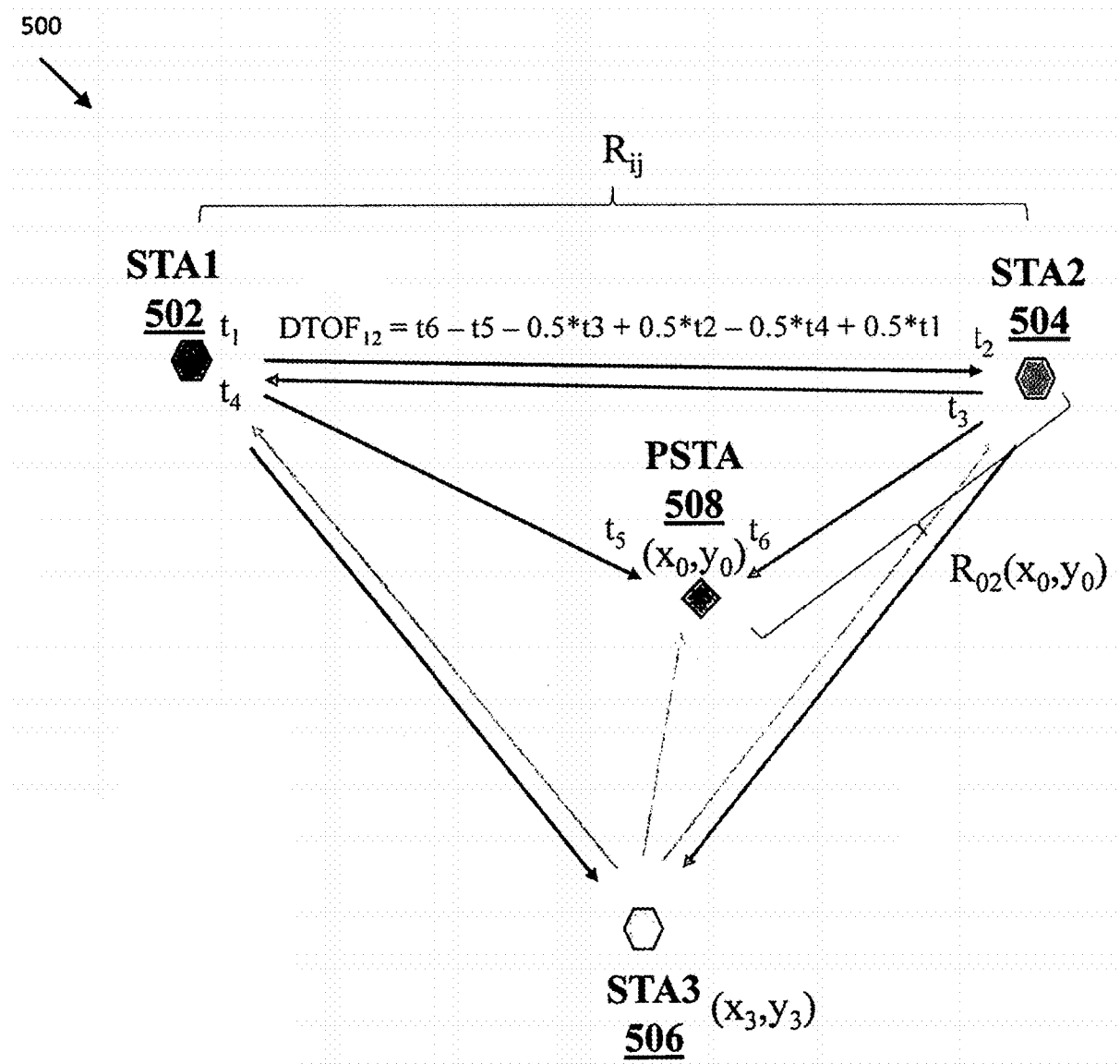
FIG. 5 illustrates a diagram of wireless network environment for calculating TOA location estimations in two dimensions, according to an embodiment.

FIG. 5 illustrates a diagram of wireless network environment for calculating TOA location estimations in two dimensions, according to an embodiment. The environment 500 includes a first STA 502, a second STA 504, a third STA 506 and a PSTA 508. The PSTA 508 coordinates are $x_0$, $y_0$, and there are two unknowns. There are three differential TOA equations, as in Equations (5), (6) and (7).

$$DToA_{12} = (R_{01} - R_{02})/c \qquad (5)$$

$$DToA_{13} = (R_{01} - R_{03})/c \qquad (6)$$

$$DToA_{23} = (R_{02} - R_{03})/c \qquad (7)$$

Equations (5), (6), and (7) may be solved as follows. Using Newton's method for multiple variables, the linearization is as in Equation (8).

$$F = f(x^*) \approx f(x_k) + \nabla f(x_k)\Delta x \qquad (8)$$

where $$\nabla f(x) = \left[\frac{\delta f_i}{\delta x_j}\right]$$

The over-determined non-linear system of Equation (8) is used to solve for $\Delta x$ as in Equation (9).

$$F - f(x_k) \approx + \nabla f(x_k)\Delta x \qquad (9)$$

Next, the least squares solution iterative step is utilized as in Equation (10).

$$x_{k+1} - x_k = \Delta x = (\nabla^T f(x_k)\nabla f(x_k))^{-1}\nabla^T f(x_k)[F-f(x_k)] \qquad (10)$$

And it is iterated according to Equation (11).

$$x_{k+1} = x_k + (\nabla^T f(x_k)\nabla f(x_k))^{-1}\nabla^T f(x_k)[F-f(x_k)] \qquad (11)$$

To simplify the equations, time is measured in light seconds (e.g., the distance light travels in one second) to derive the following Equations (12)-(16).

$$DToA_{ij} = f_{ij}(x_0, y_0) = R_i - R_j \qquad (12)$$

$$R_i = \sqrt{(x_0 - x_i)^2 + (y_0 - y_i)^2} \qquad (13)$$

$$R_j = \sqrt{(x_0 - x_j)^2 + (y_0 - y_j)^2} \qquad (14)$$

$$\nabla_{x,y} f_{ij}(x_0, y_0) = \begin{bmatrix} \frac{\delta(R_i(x_0, y_0) - R_j(x_0, y_0))}{\delta x_0} \\ \frac{\delta(R_i(x_0, y_0) - R_j(x_0, y_0))}{\delta y_0} \end{bmatrix} \qquad (15)$$

$$\nabla_{x,y} f_{ij}(x_0, y_0) = \begin{bmatrix} \frac{x_0 - x_i}{R_i(x_0, y_0)} - \frac{x_0 - x_j}{R_j(x_0, y_0)} \\ \frac{y_0 - y_i}{R_i(x_0, y_0)} - \frac{y_0 - y_i}{R_j(x_0, y_0)} \end{bmatrix} \qquad (16)$$

The iterative solution for the PSTA 508 position is calculated as in Equation (17):

$$\begin{bmatrix} DTOA_{12} - (R_{01} - R_{02}) \\ DTOA_{13} - (R_{01} - R_{03}) \\ DTOA_{23} - (R_{02} - R_{03}) \end{bmatrix} = $$

$$\begin{bmatrix} \frac{x_0-x_1}{R_{01}(x_0,y_0)} - \frac{x_0-x_2}{R_{02}(x_0,y_0)} & \frac{y_0-y_1}{R_{01}(x_0,y_0)} - \frac{y_0-y_2}{R_{02}(x_0,y_0)} \\ \frac{x_0-x_1}{R_{01}(x_0,y_0)} - \frac{x_0-x_3}{R_{03}(x_0,y_0)} & \frac{y_0-y_1}{R_{01}(x_0,y_0)} - \frac{y_0-y_3}{R_{03}(x_0,y_0)} \\ \frac{x_0-x_2}{R_{02}(x_0,y_0)} - \frac{x_0-x_3}{R_{03}(x_0,y_0)} & \frac{y_0-y_2}{R_{02}(x_0,y_0)} - \frac{y_0-x_3}{R_{03}(x_0,y_0)} \end{bmatrix} \begin{bmatrix} \Delta x_0 \\ \Delta y_0 \end{bmatrix} \qquad (17)$$

where the iterations are performed as in Equation (18).

$$\begin{bmatrix} x_0(k+1) \\ y_0(k+1) \end{bmatrix} = \begin{bmatrix} x_0(k) \\ y_0(k) \end{bmatrix} + \begin{bmatrix} \Delta x_0 \\ \Delta y_0 \end{bmatrix} \qquad (18)$$

Figure 6:
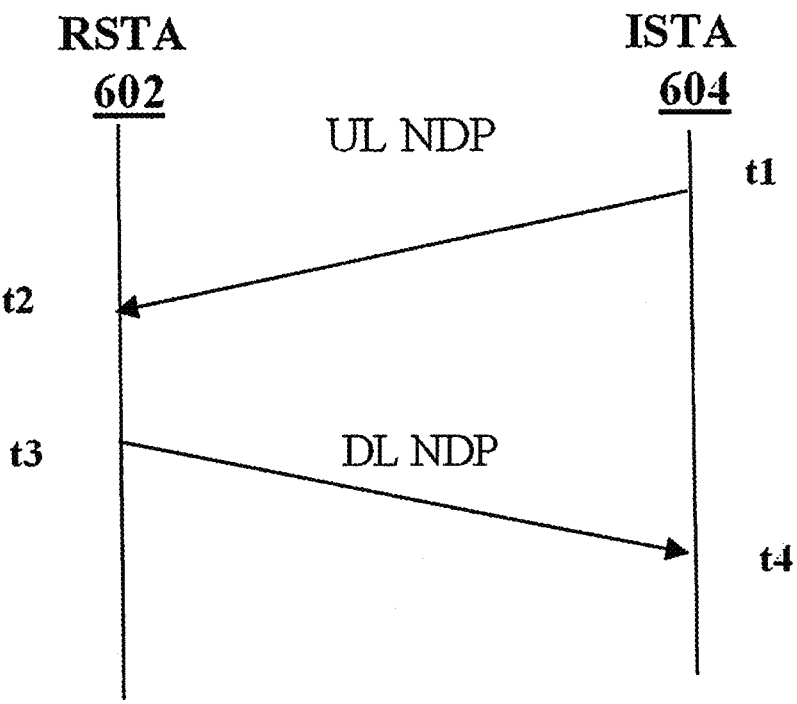
FIG. 6 illustrates a diagram of a wireless network environment, according to an embodiment.

FIG. 6 illustrates a diagram of a wireless network environment, according to an embodiment. The environment 600 includes an RSTA 602 and an ISTA 604. The ISTA 604 transmits a I2R NDP at time t1 and the RSTA 602 receives the I2R NDP at time t2. The RSTA 602 transmits the R2I NDP at time t3 and the ISTA 604 receives the R2I NDP at t4. The differential distance between the ISTA 604 and the RSTA 602 can be calculated as in Equation (19).

$$D\_IR = [(t2-t1)+(t4-t3)]/2*c \qquad (19)$$

When using the PS-TOA for t4, t4 will be too large, as the PS-TOA is the time that corresponds to the average phase rotation (i.e., per tone) in the frequency domain version of the channel. A phase rotation (per tone) in the frequency domain of the channel corresponds to a time-shift in the time domain version of the channel that can be expressed in the PS-TOA. To make the calculation in Equation (19) work, the responder can compensate by either decreasing t2 or increasing t3. Referring back to FIG. 4, the differential distance from a PSTA 406 to an ISTA-RSTA pair is calculated as in Equation (4). Likewise, when using PS-TOA for t4, t4 will be too large, and the responder can compensate by increasing t2 or decreasing t3. Thus, the RSTA 402 cannot adjust its reported time stamps, t2 and t3, such as to make both calculations of Equation (4) and Equation (19) work.

Assuming t4 is measured with PS-TOA and denoting the PS-TOA variant of t4 as tp4, the distance between the ISTA and the RSTA can be calculated as in Equation (20):

$$D\_IR = [(t2-t1)+(tp4-tp4\_corr-t3)]/2*c \qquad (20)$$

where, as in Equation (21):

$$tp4\_corr = tp2 - t2 \qquad (21)$$

is the correction to the PS-TOA variant of t4 and tp2 is the PS-TOA variant of t2. Thus, D_IR can be written as in Equation (22).

$$D\_IR = [t2-t1+tp4-tp2+t2-t3]/2*c = [2*t2-tp2-t1+tp4-t3]/2*c \qquad (22)$$

Either the RSTA can communicate the correction to t4=tp2−t2, or the RSTA can communicate the PS-TOA variant of t2 and along with t2.

The differential distance from the PSTA to the ISTA-RSTA pair can be calculated as in Equation (23):

$$DD\_PIR=[t6-t5-0.5*t3+0.5*t2-0.5*t4+0.5*t1]*c=\\ [t6-t5-0.5*t3+0.5*t2-0.5*(tp4-tp4\_corr)+\\ 0.5*t1]*c \quad (23)$$

where, as in Equation (21), tp4_corr is the correction to the PS-TOA variant of t4 and tp2 is the PS-TOA variant of t2. Thus, the DD_PIR can be written as Equation (24):

$$DD\_PIR=[t6-t5-0.5*t3+0.5*tp2-0.5*tp4+0.5*t1]*c \quad (24)$$

Equation (24) does not include t2 or t4. The calculations for passive location ranging disclosed herein enables a method for supporting passive location ranging where the RSTA and the ISTAs do not need to measure TOAs but only need to measure PS-TOAs which are simpler to measure quicker. This enables simpler infrastructure and also simplifies the realization of a system with direct feedback on both the RSTA and the ISTA side, thereby simplifying the protocol for the passive station as it removes state from the process.

In one embodiment, assume that t2 is measured with PS-TOA and the PS-TOA variant of t2 is denoted as tp2. The distance between the ISTA and the RSTA can be calculated as Equation (25):

$$D\_IR=[(tp2-tp2\_corr-t1)+(t4-t3)]/2*c \quad (25)$$

where, as in Equation (26):

$$tp2\_corr=tp4-t4 \quad (26)$$

is the correction to the PS-TOA variant of t2 and tp4 is the PS-TOA variant of t4. The distance between the ISTA and the RSTA can be calculated as in Equation (27).

$$D\_IR=[tp2-tp4+t4-t1+t4-t3]/2*c=[2*t4-tp4-t1+tp2-t3]/2*c \quad (27)$$

Either the ISTA can communicate the correction to tp2 or the ISTA can communicate the PS-TOA variant of t4, along with t4. In this embodiment, the differential distance from the PSTA to the ISTA-RSTA pair can be calculated as Equation (28):

$$DD\_PIR=[t6-t5-0.5*t3+0.5*t2-0.5*t4+0.5*t1]*c=\\ [t6-t5-0.5*t3+0.5*(tp2-tp2\_corr)-0.5*t4+\\ 0.5*t1]*c \quad (28)$$

where tp2_corr is the correction to the PS-TOA variant of t2 and tp2 is the PS-TOA variant of t2. The differential distance can be calculated as in Equation (29).

$$DD\_PIR=[t6-t5-0.5*t3+0.5*tp2-0.5*tp4+0.5*t1]*c \quad (29)$$

Equation (29) does not include t2 or t4.

As described herein, the STAs may determine a correction to a PS-TOA and/or a corrected PS-TOA. The correction to the PS-TOA as well as the corrected PS-TOA may be referred to as corrected data, as the STAs may determine one or both of these data, and report and/or broadcast the corrected data.

Figure 7:
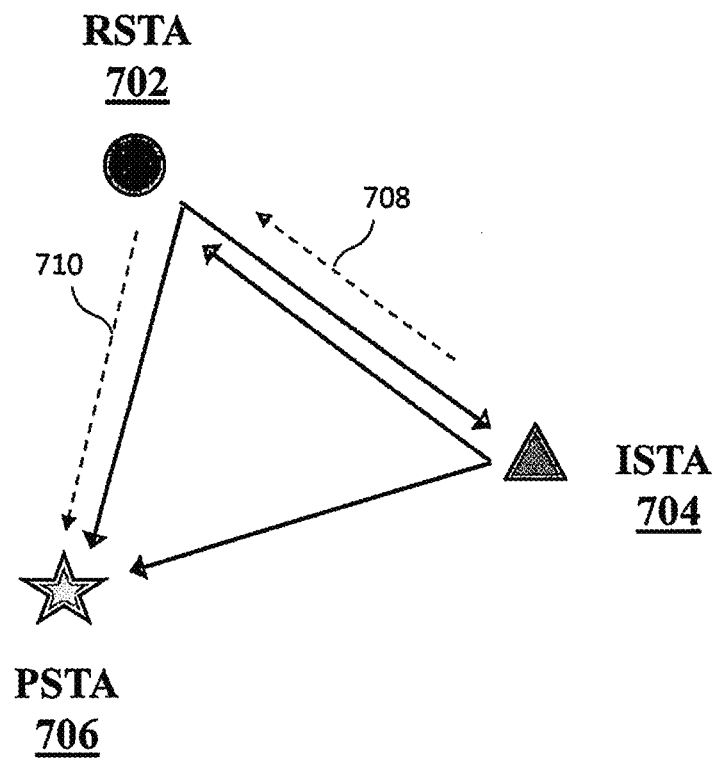
FIG. 7 illustrates a diagram of a wireless network environment where an ISTA reports the PS-TOA, according to an embodiment.

In some embodiments, the ISTA reports the PS-TOA for passive location with PR based TOA reporting. FIG. 7 illustrates a diagram of a wireless network environment where an ISTA reports the PS-TOA, according to an embodiment. The environment 700 includes an RSTA 702, an ISTA 704 and a PSTA 706. It is understood that the environment 700 may include multiple RSTAs, ISTA, and/or PSTAs. In the environment 700, the ISTA 704 may transmit a PS-TOA to the RSTA 702 (as indicated by arrow 708), the RSTA 702 may broadcast the PS-TOA (as indicated by arrow 710), and the PSTA 706 may determine the differential distance between the RSTA-ISTA pair based on the broadcast signal of the RSTA 702.

Figure 8A:
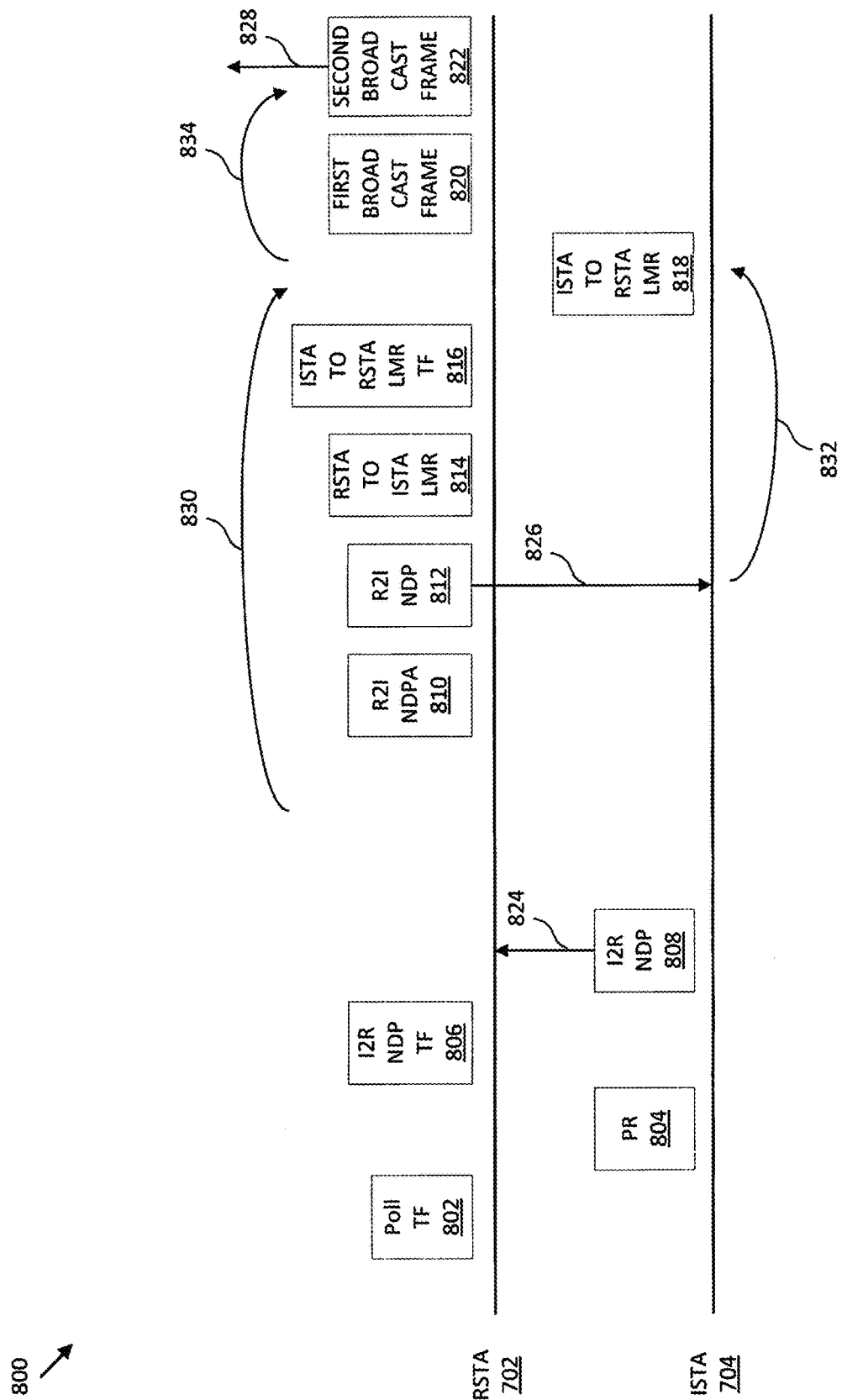
FIGS. 8A, 8B and 8C illustrate frames in a TB ranging protocol where an ISTA reports the PS-TOA, according to an embodiment.
Figure 8B:
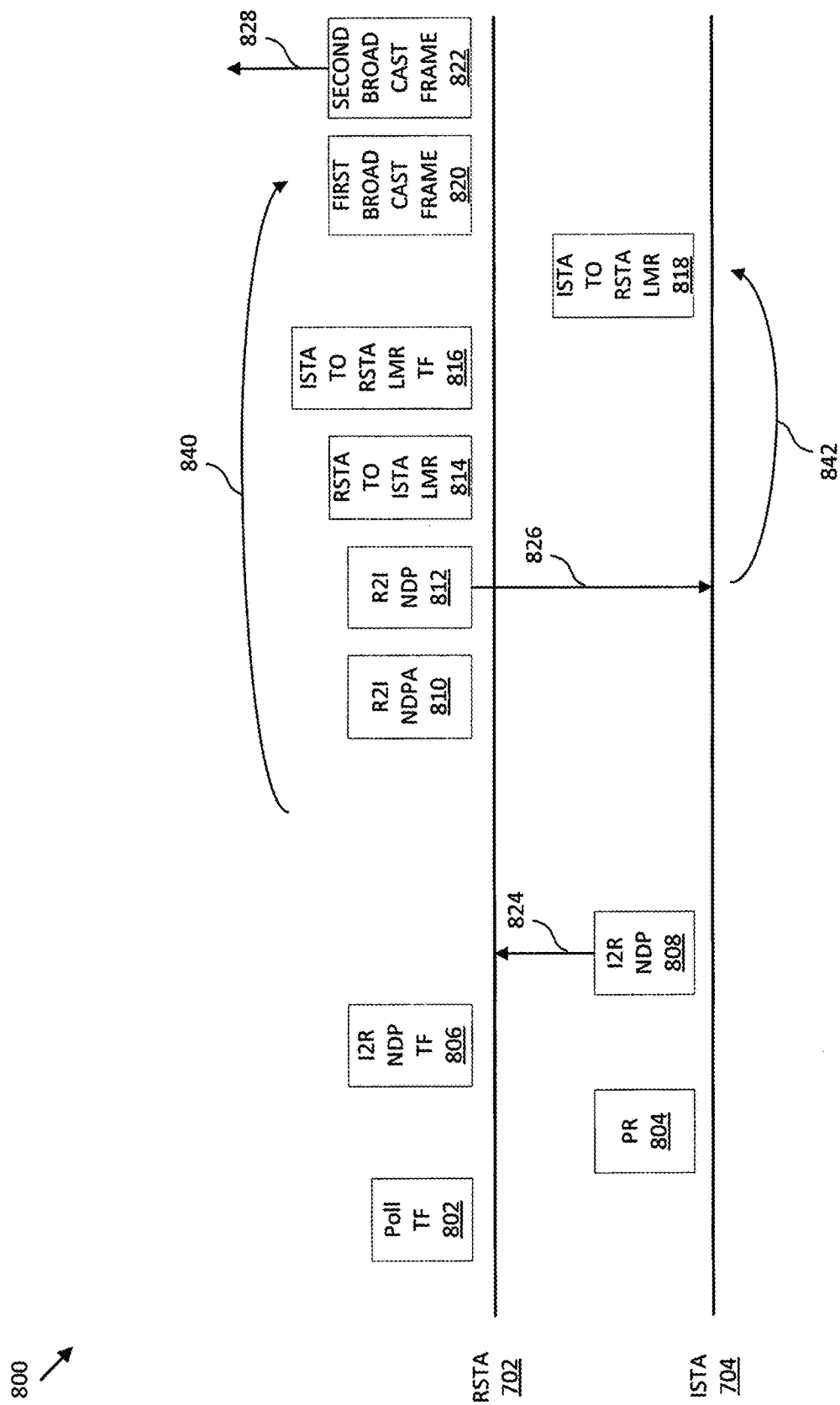
Figure 8C:
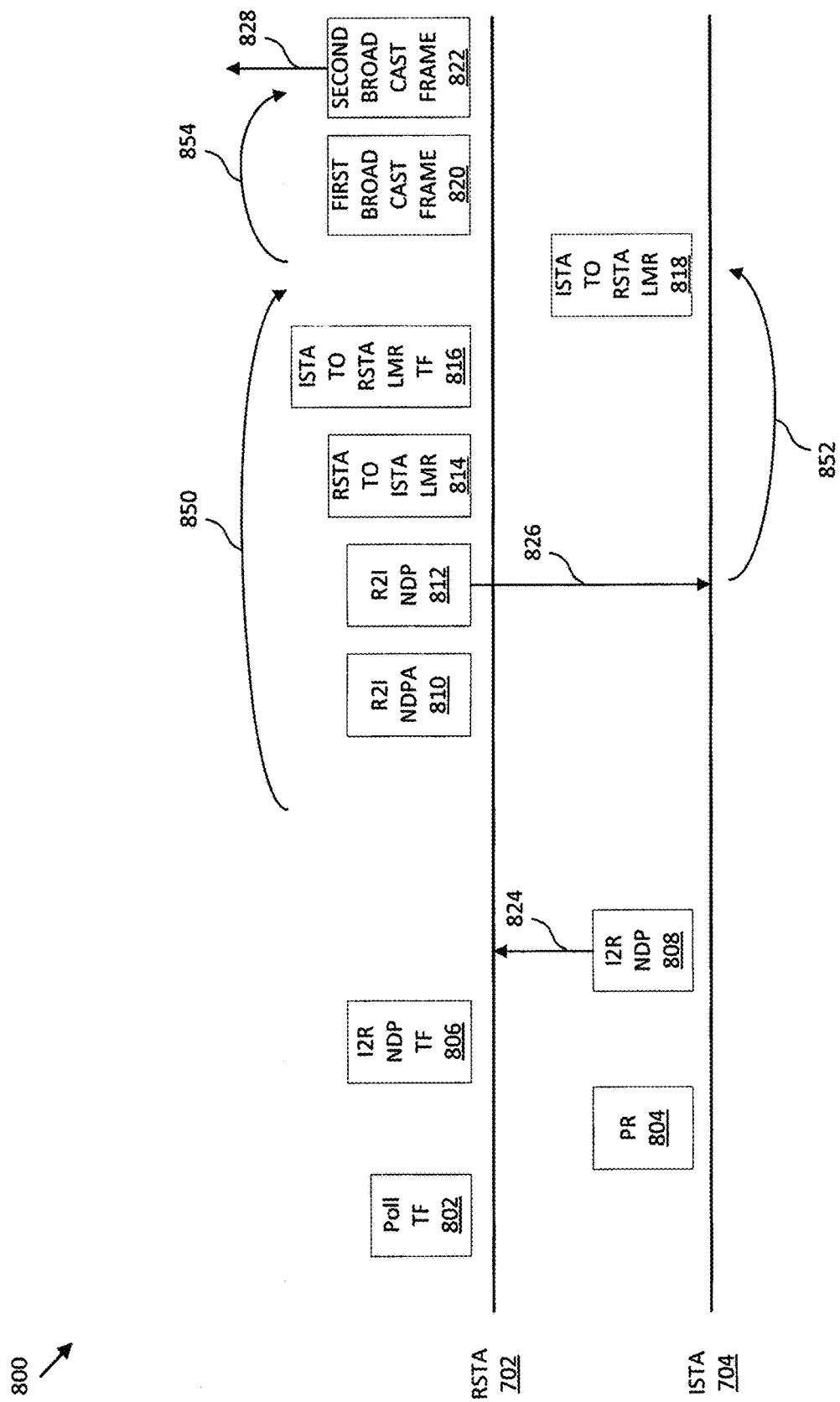

FIGS. 8A, 8B and 8C illustrate frames in a TB ranging protocol where an ISTA 704 reports the PS-TOA, according to an embodiment. The TB ranging protocol 800 includes frames in a system with an RSTA 702, and an ISTA 704. The RSTA 702 transmits a poll TF 802 and the ISTA 704 generates a PR 804. Then, the RSTA 702 transmits a I2R NDP TF 806 for the ISTA 704 and the ISTA 704 transmits the I2R NDP 808 to the RSTA 702 (as indicated by an arrow 824). The RSTA 702 then generates a R2I NDPA frame 810 and transmits a R2I NDP 812 to the ISTA 704 (as indicated by an arrow 826). The RSTA 702 generates an RSTA to ISTA LMR 814 and generates an ISTA to RSTA LMR TF 816. The ISTA 704 generates an ISTA to RSTA LMR 818. The protocol 800 includes a first broadcast frame 820 (e.g., a Primus LCI/LMR broadcast frame) and a second broadcast frame 822 (e.g., a Secundus LCI/LMR broadcast frame) for passive location ranging. The RSTA 702 broadcasts the PS-TOA in the second broadcast frame 822 (as indicated by arrow 828).

In one embodiment as shown in FIG. 8A, the PS-TOA is determined by the ISTA 704 and reported to the RSTA 702 (as indicated by the arrow 830). The RSTA 702 determines a corrected PS-TOA by using the PS-TOA reported by the ISTA 704 and the assumption of reciprocity. The RSTA 702 determines the corrected PS-TOA by determining a correction to the ISTA 704's PS-TOA. The determination of the corrected PS-TOA may be performed between the R2I NDPA 810 and the ISTA to RSTA LMR TF 816 (as indicated by an arrow 832). The RSTA 702 determines the corrected PS-TOA by determining a difference between the RSTA 702's PS-TOA and the ISTA 704's TOA from the I2R NDP 808. The RSTA 702 then broadcasts the corrected PS-TOA in the Secundus broadcast frame 822 (as indicated by arrow 828), which may be observed by the PSTA 706. This example may require a tight turn-around time from the ISTA to RSTA LMR TF 816 to the reporting of the corrected ISTA TOAs in the broadcast frame 822 (as indicated by arrow 834).

In one embodiment as shown in FIG. 8B, instead of the RSTA 704 broadcasting corrections to the ISTA's PS-TOAs, the RSTA 702 can broadcast the PS-TOAs it has measured based on the ISTA's 704 I2R NDP 808 (as indicated by arrow 840), and this can be broadcast in the extra frame 820. The determination of the corrected PS-TOA may be performed between the R2I NDPA 810 and the ISTA to RSTA LMR TF 816 (as indicated by an arrow 842).

In another embodiment as shown in FIG. 8C, the ISTA 704 measures the PS-TOA for the R2I NDP 812 and TOD for the I2R NDP 808. These values are then received by the RSTA 702 and broadcast to the PSTA 706 by the RSTA 702 (as indicated by arrow 854). The RSTA 702 may broadcast the RSTA's 702 PS-TOAs and TODs at the first extra frame 820 and broadcast the ISTA's 704 PS-TOAs and TODs at the second extra frame 822. The PS-TOA is determined by the ISTA 704 and reported to the RSTA 702 (as indicated by the arrow 850). The determination of the corrected PS-TOA may be performed between the R2I NDPA 810 and the ISTA to RSTA LMR TF 816 (as indicated by an arrow 852).

Figure 9:
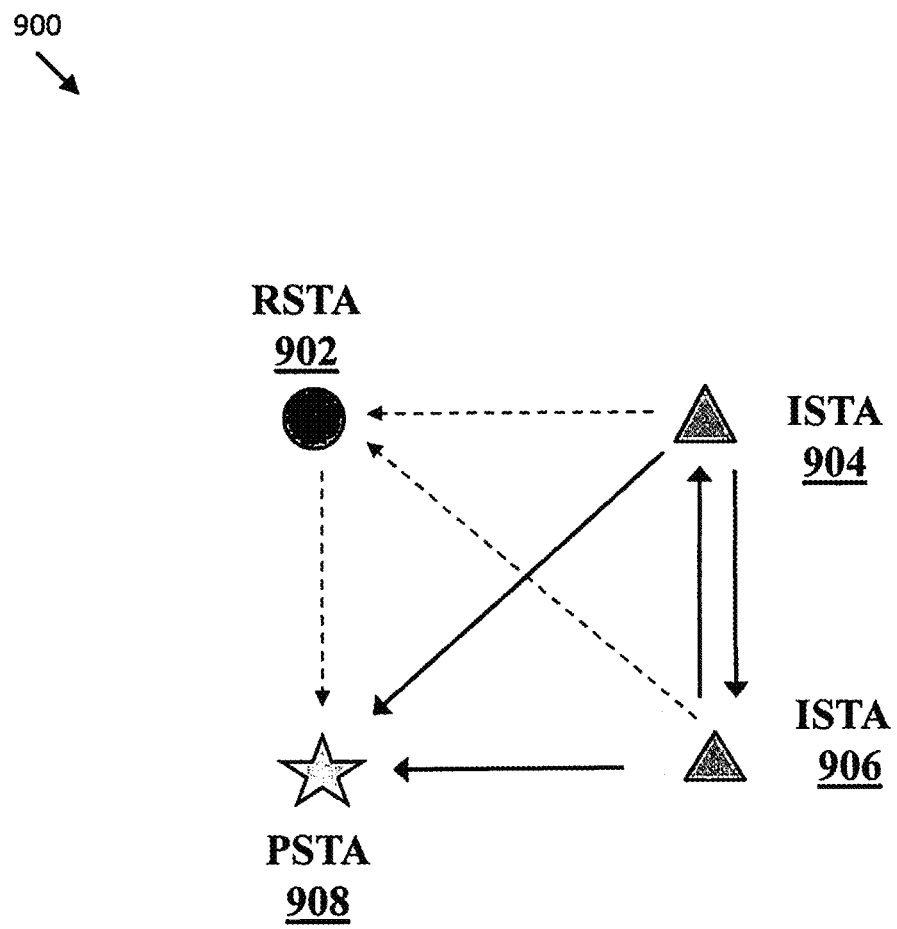
FIG. 9 illustrates a diagram of a wireless network environment, according to an embodiment.

FIG. 9 illustrates a diagram of a wireless network environment, according to an embodiment. The environment 900 includes an RSTA 902, a first ISTA 904, a second ISTA 906 and a PSTA 908. It is understood that multiple RSTAs and PSTAs, as well as additional ISTAs may be included in the environment. In one embodiment, the correction of the ISTA's 906 PS-TOA is calculated by the ISTA 904 using the assumption of reciprocity and is fed back to the RSTA 902. Also, the ISTA 904 can report the PS-TOA it has measured on the I2R NDP from the ISTA 906. This reporting is in addition to the reporting of the TOA the ISTA 904 measures on the I2R NDP from the ISTA 906. In another example, the RSTA 902 can broadcast the PS-TOAs measured and reported by the ISTAs 904 and 906 instead of the RSTA broadcasting corrections to the ISTA's PS-TOAs. In another example, the ISTA 904 reports the PS-TOA it has measured on the I2R NDP from the ISTA 906 and the RSTA 902 broadcasts the PS-TOA of the ISTA 904 measured on the I2R NDP of the ISTA 904 and the PS-TOA of the ISTA 904 measured on the I2R NDP from the ISTA 906.

Figure 10:
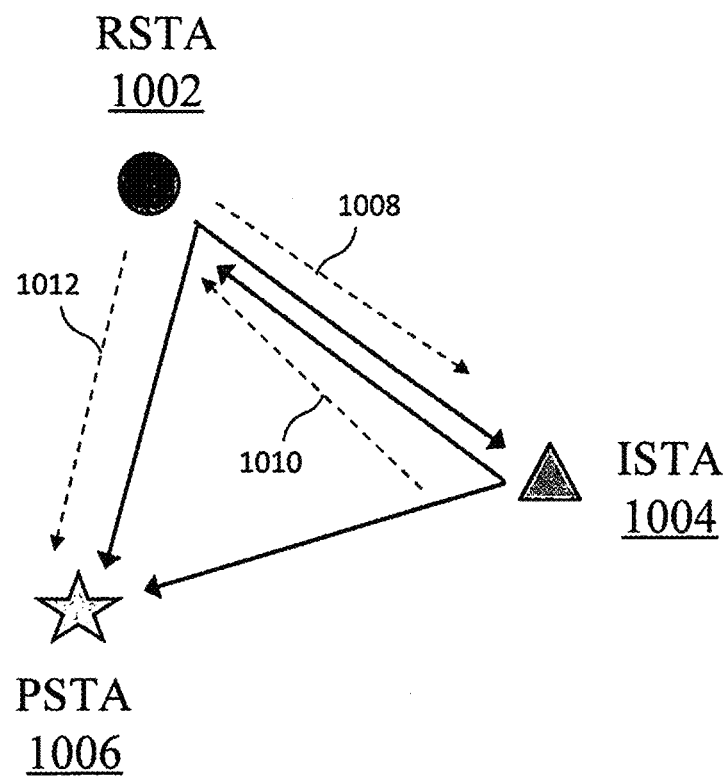
FIG. 10 illustrates a diagram of a wireless network environment where an RSTA reports the PS-TOA, according to an embodiment.

ISTA PS-TOA reporting enables a design of passive location ISTAs as well as RSTAs as neither of them necessarily need to measure the TOAs, just the PS-TOAs. This simplifies immediate feedback for the ISTAs as well as the RSTAs, as the PS-TOA may be something that is more or less already calculated by a wi-fi modem, therefore immediate ISTA feedback is greatly simplified. Since, either with a powerful enough RSTA that, in addition to calculating its own TOAs, is capable to immediately turn around and broadcast the corrections to the ISTA's PS-TOAs, or with an RSTA that only measures and turns around PS-TOAs, the embodiment provides immediate feedback for all time stamps. The RSTA can broadcast corrected PS-TOAs, corrections to the PS-TOAs and the PS-TOAs, or the PS-TOAs it has measured on the I2R NDPs from the ISTAs and the PS-TOAs the ISTAs have reported. It is also possible to make use of a mixture of ISTAs that report PS-TOAs and other ISTAs that can calculate PS-TOA corrections or report its measured PS-TOAs In one embodiment, the RSTA reports the PS-TOA for passive location with PS based TOA reporting. FIG. 10 illustrates a diagram of a wireless network environment where an RSTA reports the PS-TOA, according to an embodiment. The environment 1000 includes an RSTA 1002, an ISTA 1004 and a PSTA 1006. It is understood that the environment 1000 may include multiple RSTAs, ISTAs, and/or PSTAs. In the environment 1000, the RSTA 1002 transmits a PS-TOA to the ISTA 1004 (as indicated by arrow 1008), the ISTA 1004 transmits a PS-TOA to the RSTA 1002 (as indicated by arrow 1010), the RSTA 1002 broadcasts the PS-TOAs (as indicated by arrow 1012), and the PSTA 1006 determines the differential distance between the RSTA-ISTA pair based on the PS-TOAs broadcast by the RSTA 1002.

Figure 11A:
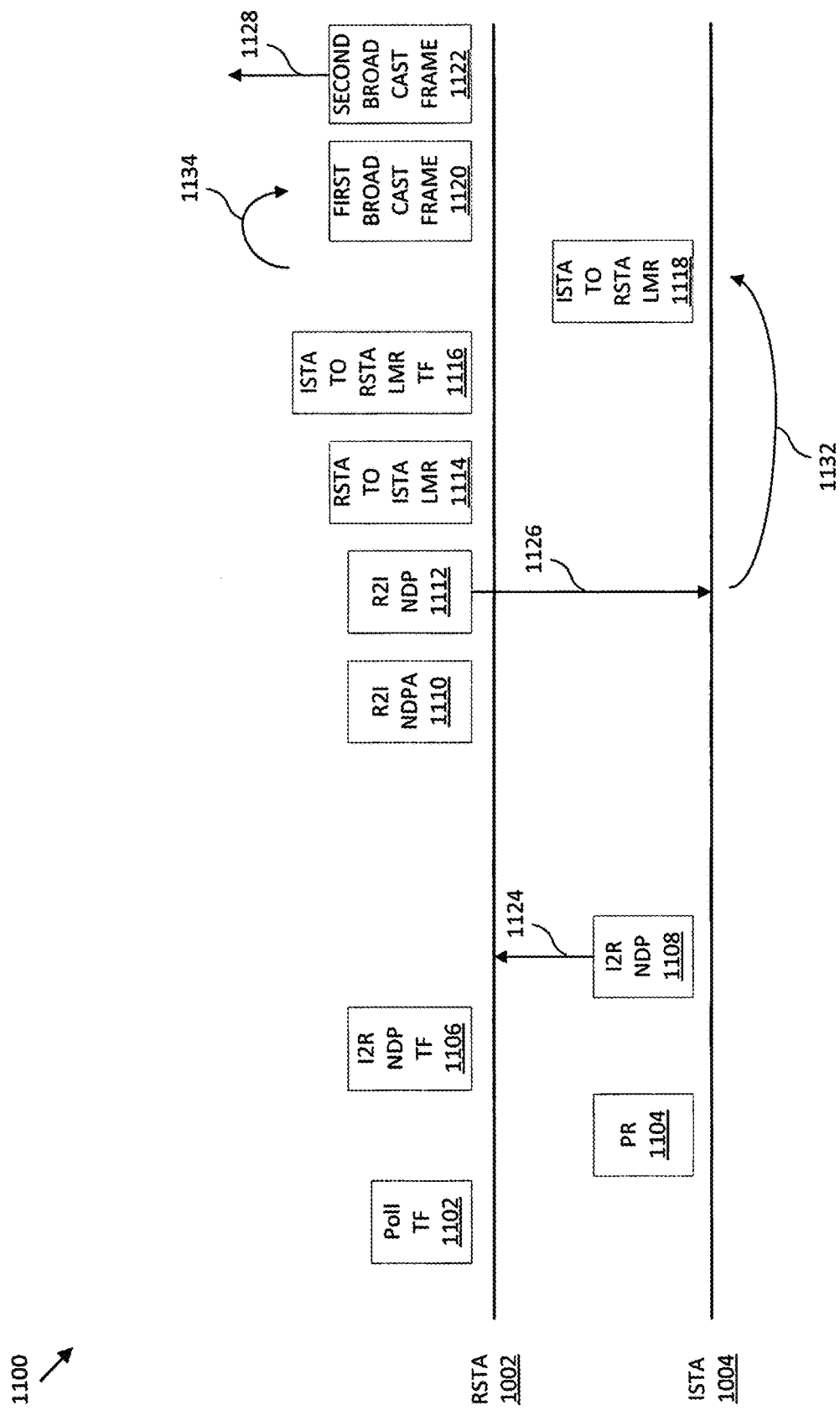
FIGS. 11A, 11B and 11C illustrate frames in a TB ranging protocol where an RSTA reports the PS-TOA, according to an embodiment.
Figure 11B:
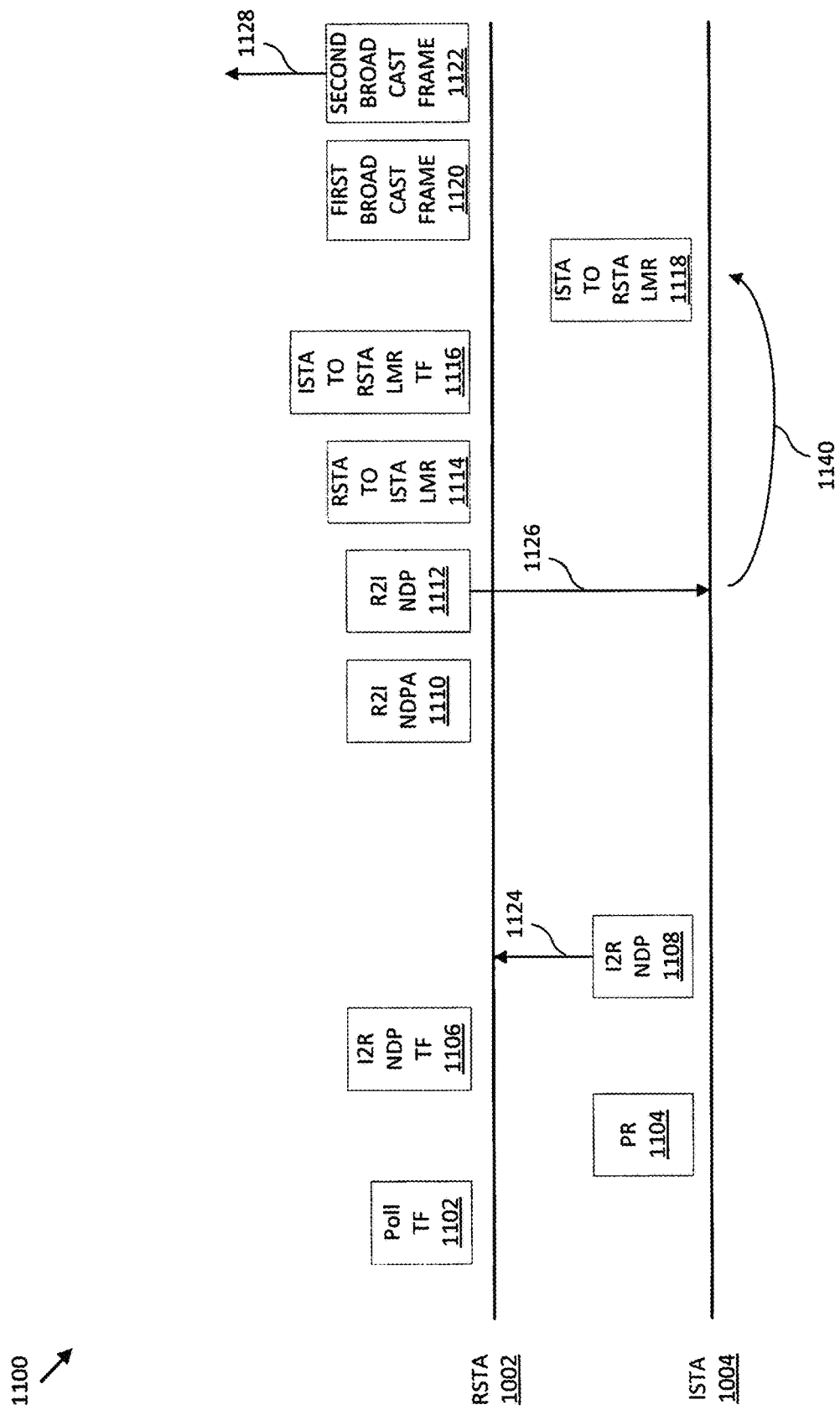
Figure 11C:
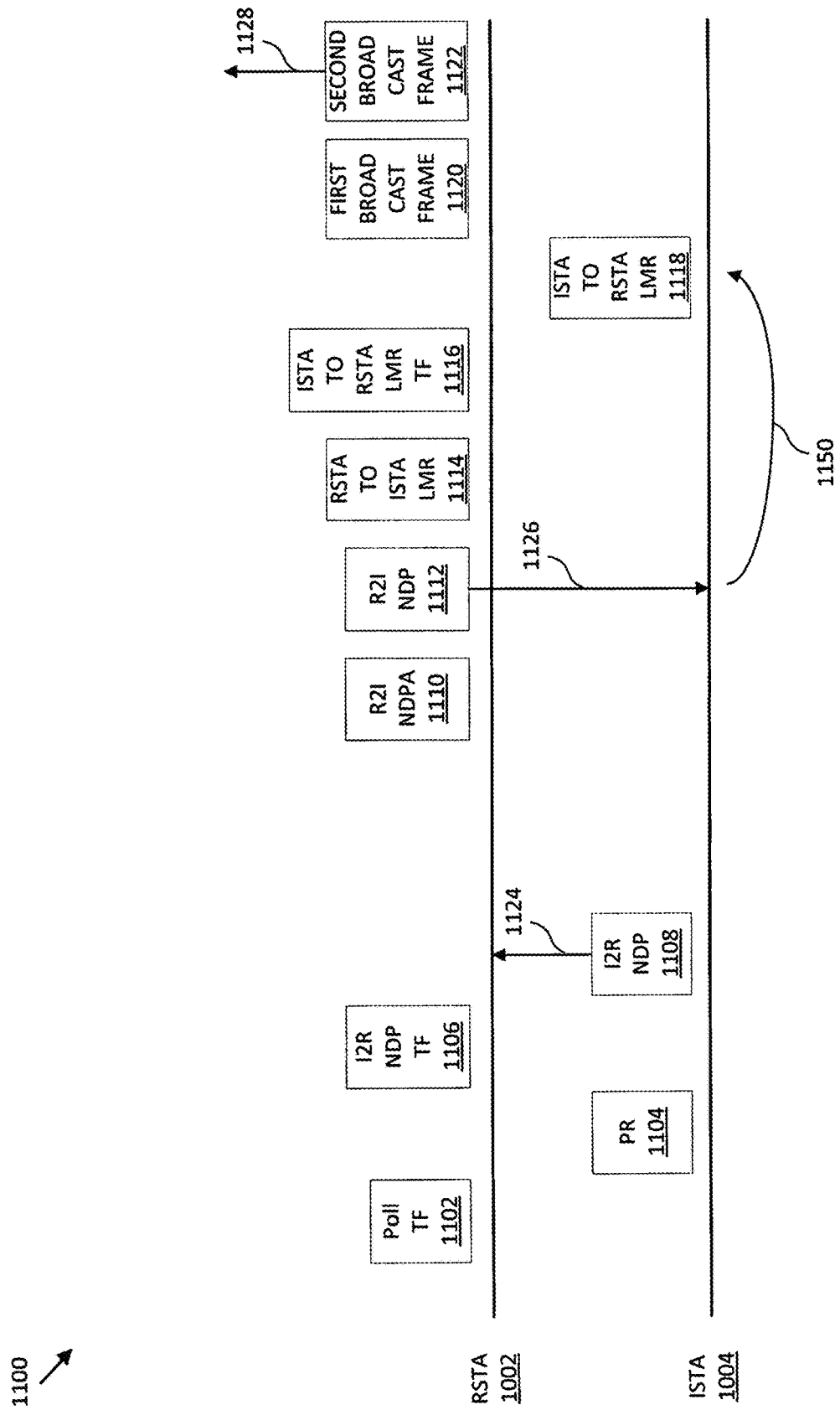

FIGS. 11A, 11B and 11C illustrate frames in a TB ranging protocol where an RSTA reports the PS-TOA, according to an embodiment. The TB ranging protocol 1100 includes frames in a system with an RSTA 1002, and an ISTA 1004. The RSTA 1002 transmits a poll TF 1102 and the ISTA 1004 generates a PR 1104. Then, the RSTA 1002 transmits a I2R NDP TF 1106 for the ISTA 1004 and the ISTA 1004 transmits the I2R NDP 1108 to the RSTA 1002 (as indicated by an arrow 1124). The RSTA 1002 then generates a R2I NDPA frame 1110 and transmits a R2I NDP 1112 to the ISTA 1004 (as indicated by an arrow 1126). The RSTA 1002 generates an RSTA to ISTA LMR 1114 and generates an ISTA to RSTA LMR TF 1116. The ISTA 1004 generates an ISTA to RSTA LMR 1118. The protocol 1100 includes a first broadcast frame 1120 (e.g., a Primus LCI/LMR broadcast frame) and a second broadcast frame 1122 (e.g., a Secundus LCI/LMR broadcast frame) for passive location ranging. The RSTA 1002 broadcasts the PS-TOA in the second broadcast frame 1122 (as indicated by arrow 1128).

In one embodiment as shown in FIG. 11A, the PS-TOA is measured by the RSTA 1002 and the corrections to the RSTA's 1002 PS-TOA are calculated by the ISTA 1004. Alternatively, the ISTA 1004 can report the PS-TOAs it has measured on the RSTA's 1002 R2I NDP 1112. The determination of the corrected PS-TOA may be performed between the R2I NDPA 1110 and the ISTA to RSTA LMR TF 1116 (as indicated by an arrow 1132). Then, the corrected PS-TOAs and the TODs for the RSTA 1002 are broadcast to the PSTA 1006 (as indicated by arrow 1134), along with the time stamps reported by the ISTA 1004. Thus, instead of the ISTA 1004 reporting corrections to the RSTA's 1002 PS-TOA, the ISTA 1004 can report the PS-TOAs it has measured on the RSTA's 1002 R2I NDP 1112.

In another embodiment as shown in FIG. 11B, corrections to the RSTA's 1002 PS-TOA can be calculated by the ISTA 1004 (as indicated by arrow 1140) using the assumption of reciprocity or the ISTA can report the PS-TOAs it has measured on the RSTA's 1002 R2I NDP 1112. The PS-TOA is measured by the RSTA 1002, and the RSTA 1002 broadcasts the RSTA's 1002 time stamps, including its PS-TOA from the RSTA 1002 to the PSTA 1006. The RSTA 1002 also rebroadcasts the time stamps reported by the ISTA 1004 including its corrections to the RSTA's 1002 PS-TOA or the ISTA's 1004 PS-TOA it has measured on the RSTA's 1002 R2I NDP 1112. The RSTA 1002 simply reports its PS-TOAs and the ISTA 1004 reports its corrections to the RSTA's 1002 PS-TOAs or the RSTA 1002 reports the R2I NDP 1112 PS-TOAs and these parameters are rebroadcast in the broadcast frames 1120 and 1122.

In another embodiment as shown in FIG. 11C, the RSTA 1002 measures the PS-TOA on the I2R NDP 1108 and the R2I NDP 1112 TOD. The PS-TOA and TODs are reported by the RSTA 1002 to the ISTA 1004. The ISTA 1004 measures and reports the PS-TOA on the R2I NDP 1112 and the I2R NDP 1108 TOD (as indicated by arrow 1150). The RSTA 1002 broadcasts the RSTA's 1002 and the ISTA's 1004 TODs and PS-TOAs measured on the I2R NDP 1108 and the DL NDP in the first broadcast frame 1120 and the RSTA 1002 rebroadcasts the LMR reports to the ISTA 1004 in the second broadcast frame 1122.

The process of TOA reporting with the RSTA 1002 offloads RSTA processing and makes use of available processing resources at the ISTAs (e.g., during regular ranging where the ISTA 1004 wants to determine its location).

Figure 12:
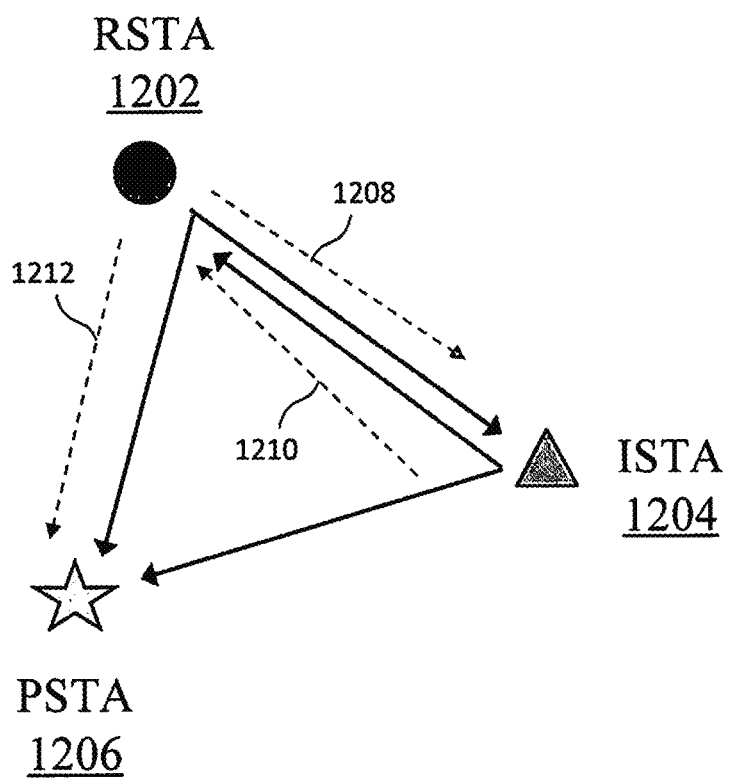
FIG. 12 illustrates a diagram of a wireless network environment where an RSTA and an ISTA reports the PS-TOA, according to an embodiment.

In one embodiment, the ISTA and the RSTA report the PS-TOA for passive location with PS based TOA reporting. FIG. 12 illustrates a diagram of a wireless network environment where an RSTA and an ISTA reports the PS-TOA, according to an embodiment. The environment 1200 includes an RSTA 1202, an ISTA 1204 and a PSTA 1206. It is understood that the environment 1000 may include multiple RSTAs, ISTAs, and/or PSTAs. In the embodiment 1200, the RSTA 1202 measures and reports its PS-TOA and time stamps (as indicated by arrow 1208) the ISTA 1206 measures and reports its PS-TOA (as indicated by arrow 1210), the PSTA 1206 observes the broadcast of the RSTA 1202 and the ISTA 1204 (as indicated by arrow 1212) and determines a differential distance between the PSTA 1206 and the RSTA-ISTA pair based on the broadcast PS-TOAs and time stamps.

Figure 13:
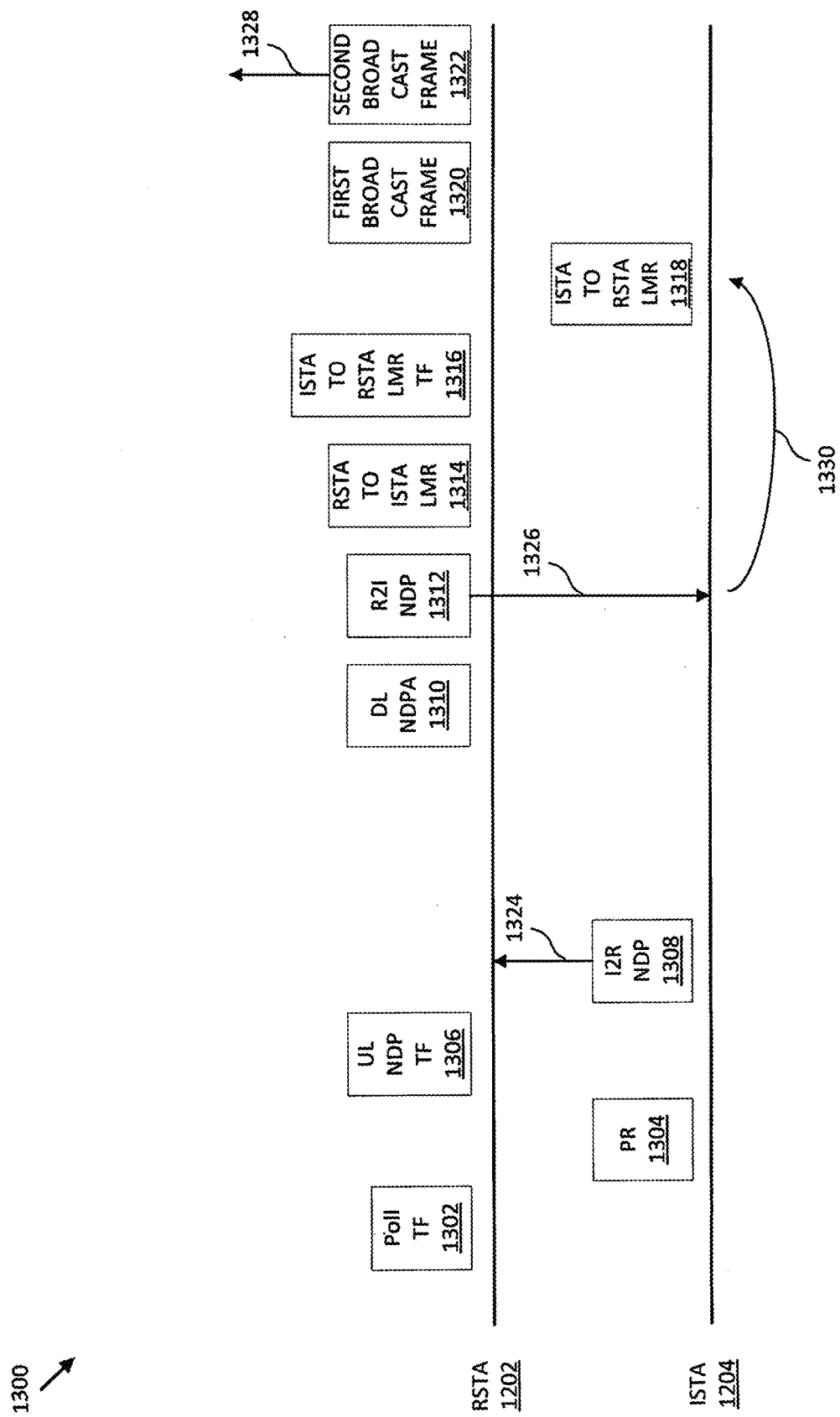
FIG. 13 illustrates frames in a TB ranging protocol where an RSTA reports the PS-TOA, according to an embodiment.

FIG. 13 illustrates frames in a TB ranging protocol where an RSTA reports the PS-TOA, according to an embodiment. The TB ranging protocol 1300 includes frames in a system with an RSTA 1202, and an ISTA 1204. The RSTA 1202 transmits a poll TF 1302 and the ISTA 1204 generates a PR 1304. Then, the RSTA 1202 transmits a I2R NDP TF 1306 for the ISTA 1204 and the ISTA 1204 transmits the I2R NDP 1308 to the RSTA 1202 (as indicated by an arrow 1324). The RSTA 1202 then generates a R2I NDPA frame 1310 and transmits a R2I NDP 1312 to the ISTA 1204 (as indicated by an arrow 1326). The RSTA 1202 generates an RSTA to ISTA LMR 1314 and generates an ISTA to RSTA LMR TF 1316. The ISTA 1204 generates an ISTA to RSTA LMR 1318. The protocol 1300 includes a first broadcast frame 1320 (e.g., a Primus LCI/LMR broadcast frame) that provides a LCI with DL LMR and a second broadcast frame 1322 (e.g., a Secundus LCI/LMR broadcast frame) that provides a UL LMR for passive location ranging. The RSTA 1202 broadcasts the PS-TOA in the UL LMR 1322 frame (as indicated by arrow 1328).

In one embodiment as shown in FIG. 13, the PS-TOA on the I2R NDP 1308 and the R2I NDP 1312 TOD are measured by the RSTA 1202. The PS-TOA and the TODs are reported by the RSTA 1202 to the ISTA 1204 (as indicated by arrow 1326). The ISTA 1204 measures and reports the PS-TOA on the R2I NDP 1312 and the I2R NDP 1308 TOD (as indicated by arrow 1330). The RSTA 1202 broadcasts the RSTA's 1202 TODs and PS-TOAs in the LCI DL LMR frame 1320 and rebroadcasts the LMR reports at the UL LMR frame 1322. With this process, all infrastructure stations (i.e., the RSTA 1202 and the anchor ISTA 1204) can be very simple in that they do not need to measure and broadcast TOAs, but only PS-TOAs that are easier to compute. This also enables using ranging between the ISTAs for passive location ranging support for the PSTAs. This process also simplifies the realization of immediate feedback on both the ISTA and the RSTA side as it is easier for them to calculate the PS-TOAs as opposed to the normally used TOA measurements.

In general the system may use the time-stamps, TODs and TOAs or PS-TOAs, and the known locations of the RSTA and ISTAs, as well as other RSTAs and ISTAs as depicted in FIG. 3, to set up a (non-linear) system of equations where the unknown are the PSTA's coordinates and the equations are various relations that one can form using known and unknown quantities.

When phase shift feedback is negotiated between an ISTA 1204 and an RSTA 1202 in passive location ranging, the protocol for the sounding phase differs from passive location ranging with regular TOA feedback in that the RSTA 1202 measures PS-TOA, in addition to measuring the TOA on the NDP 1312 it receives from the ISTA 1204 (e.g., arrow 1326) and the ISTA 1204 measures the PS-TOA (e.g., arrow 1330), in addition to measuring the TOA for the NDP 1312 it receives from the RSTA 1202. The ISTA 1204 may also measure the PS-TOAs for the NDPs it receives from other ISTA.

When phase shift feedback is negotiated between an ISTA 1204 and an RSTA 1202 in passive location ranging, the protocol for the measurement reporting phase differs from passive location ranging with regular TOA feedback. The RSTA 1202 reports the measured PS-TOA in addition to its measured TOA in the LMR frame 1322. The ISTA 1204 reports its measured PS-TOA, in addition to its measured TOA, in the ISTA 1204 passive LMR frame 1318. In the RSTA 1202's LCI DL LMR, the RSTA 1202 broadcasts its measured PS-TOA and its measured TOA for the NDPs it has received from the ISTA 1204. In the RSTA's 1202 UL LMR frame, the RSTA 1202 re-broadcasts the time-stamps the ISTA 1204 has reported to the RSTA 1202. As the ISTA 1204 has negotiated phase shift feedback, these would contain PS-TOAs in addition to TOAs.

When phase shift feedback is negotiated in passive location ranging, the reporting by both the RSTA 1202 and the ISTA 1204 of PS-TOAs may be of the immediate type. In this case, the TOD time-stamps may be reported as immediate feedback. The reported TOAs do not need to be of the immediate report type but can be delayed. The dialog token refers to the passive location ranging availability window where the reported TOA time stamps were measured, and not the availability window where the reported PS-TOAs and TODs were measured, as this is the availability window containing the reports themselves.

Furthermore, the broadcasting of TODs and PS-TOAs, related to the ISTA 1204s that has negotiated phase shift feedback, in the LCI DL LMR and UL LMR frames 1320 and 1322 may also be immediate. That is, the TODs and PS-TOAs measured by the RSTA 1202 may be broadcast in the LCI DL LMR frame 1320 following the measurement phase in which they were measured. Correspondingly, the TODs and PS-TOAs reported by the phase shift TOA reporting ISTA 1204(s) may be re-broadcast in the UL LMR frame 1322 following the reporting from the ISTA 1204(s). Again, the reported TOAs do not need to be of the immediate report type but can be delayed. Thus again, the dialog token refers to the passive location ranging availability window where the reported TOA time stamps were measured, and not the availability window where the reported PS-TOAs and TODs were measured, as this is the availability window containing the reports themselves.

Figure 14:
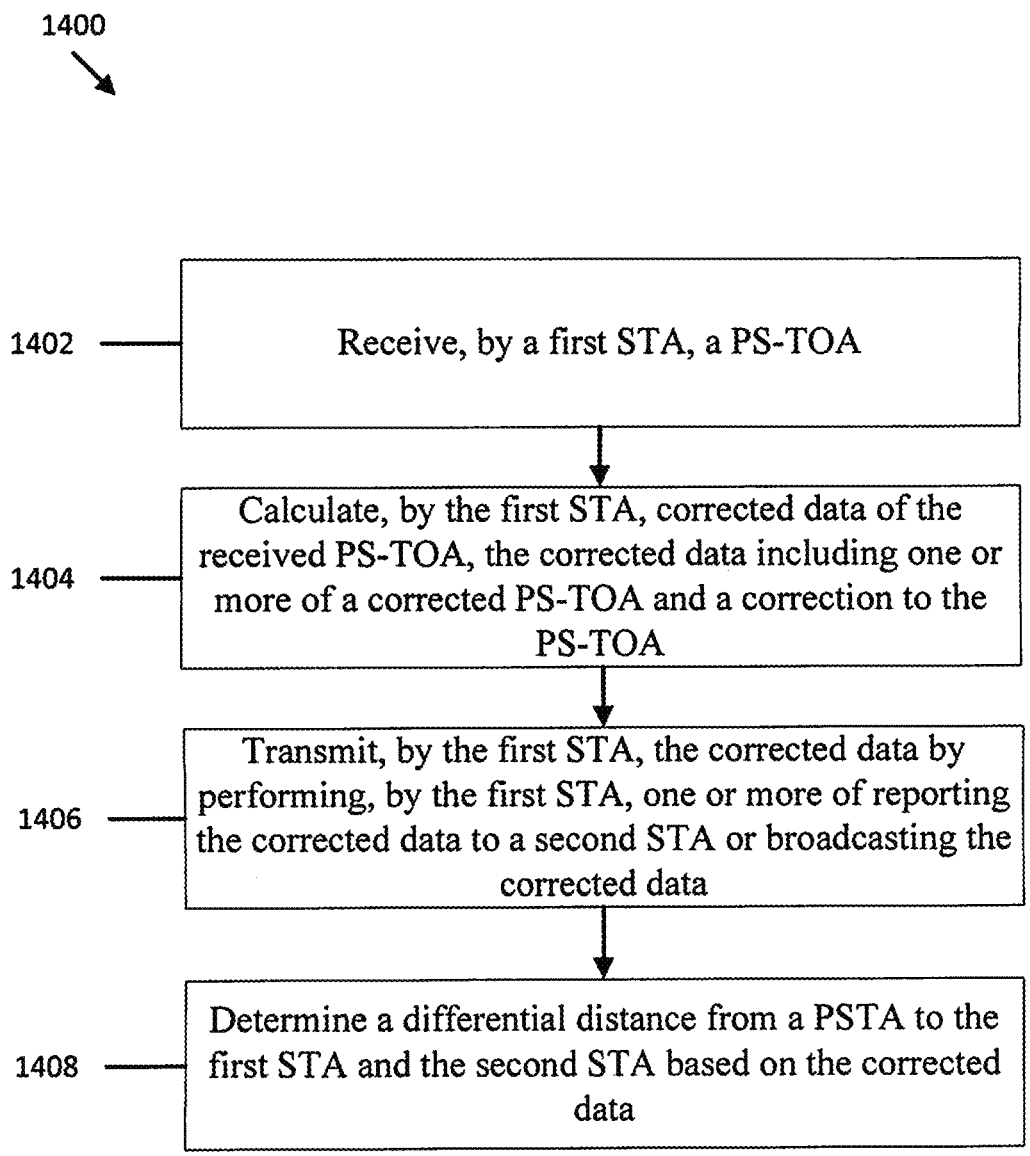
FIG. 14 illustrates a flowchart for a method of passive location in a wireless network system, according to an embodiment.

FIG. 14 illustrates a flowchart 1400 for a method of passive location in a wireless network system, according to an embodiment. At 1402, the system receives, by a first STA, a PS-TOA. The first STA may be an RSTA or an ISTA. At 1404, the system calculates, by the first STA, corrected data of the received PS-TOA, the corrected data including one or more of a corrected PS-TOA and a correction to the PS-TOA. At 1406, the system transmits, by the first STA, the corrected data by performing, by the first STA, one or more of reporting the corrected data to a second STA or broadcasting the corrected data. The second STA may be an RSTA or an ISTA. At 1408, the system determines, a differential distance from a PSTA to the first STA and the second STA based on the corrected data. The system may determine the differential distance by a PSTA.

Figure 15:
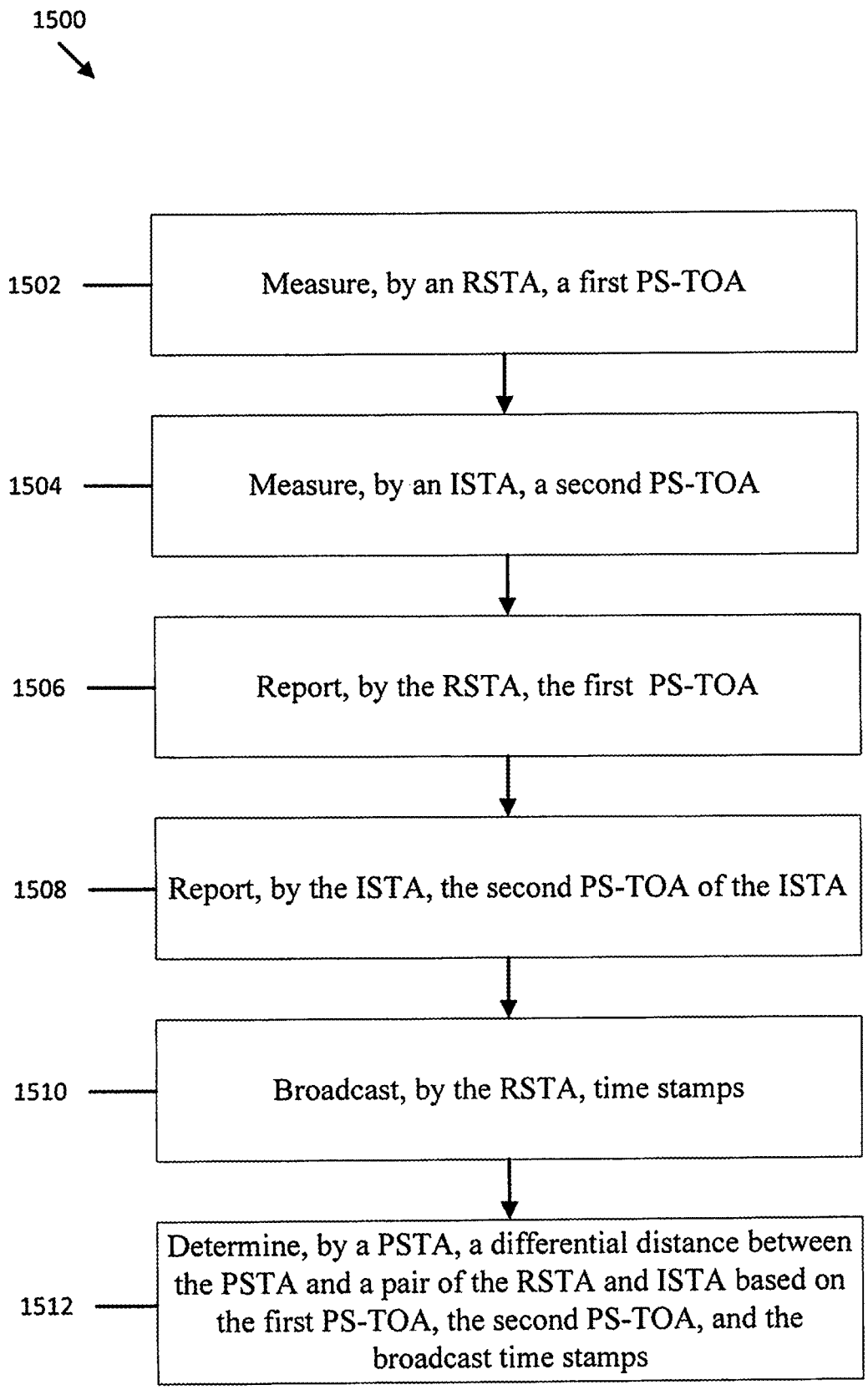
FIG. 15 illustrates a flowchart for a method of passive location in a wireless network system, according to an embodiment.

FIG. 15 illustrates a flowchart 1500 for a method of passive location in a wireless network system, according to an embodiment. At 1502, the system measures, by an RSTA, a first PS-TOA. At 1504, the system measures, by an ISTA, a second PS-TOA. At 1506, the system reports, by the RSTA, the first PS-TOA. At 1508, the system reports, by the ISTA, the second PS-TOA. At 1510, the system broadcasts, by the RSTA, time stamps. At 1512, the system determines, by a PSTA, a differential distance between the PSTA and a pair of the RSTA and ISTA based on the first PS-TOA, the second PS-TOA and the broadcast time stamps.

A passive location ISTA to RSTA LMR may include a dialog token, a carrier frequency offset (CFO) to responder and a per time-stamp that may include a type (e.g., a 2-bit number to determine 4 types such as a TOD, TOA, PS-TOA and reserved), a TOD error, a TOA error, time stamp validity, time-stamp and radio frequency ID (RFID) of transmitter. The location information (LCI)/LMR first broadcast frame may include an LCI table element and a DL LMR that may include a type (e.g., a 2-bit number to determine 4 types such as a TOD, TOA, PS-TOA and reserved), a TOD error, a TOA error, time stamp validity, time-stamp and radio frequency ID (RID) of transmitter (RID=0 for RSTA). The LCI/LMR second broadcast frame may include, per ISTA device, a type (e.g., a 2-bit number to determine 4 types such as a TOD, TOA, PS-TOA and reserved), a TOD error, a TOA error, time stamp validity, time-stamp and radio frequency ID (RFID) of transmitter. The LCI/LMR second broadcast frame can be a copy of the LMR report from each ISTA.

The present ISTAs that report phase roll based TOA provide a significant reduction of calculation complexity and are also more likely to report the measurement results in the same ranging sequence (ranging opportunity) as where the measurements were made. By reporting its PS-TOA measurement in the same ranging opportunity as measuring it, the passive location ranging reporting protocol is simplified by removing some state dependency between ranging opportunities in the protocol.

The passive location ranging mode includes ranging exchanges between an RSTA and a set of ISTAs. These ranging exchanges and associated measurement reporting are set up such that an arbitrary STA can listen in to them and use the ranging exchanges and reported ranging measurements to estimate its differential distance to pairs or sets including the RSTA and/or one or more ISTAs. The listening STA, a PSTA, is not itself an active transmitting participant in the ranging exchange. That is, the PSTA can passively estimate its differential distances to the RSTA and the ISTAs pairs. It can then use these differential distances together with knowledge of the RSTA and ISTA locations to estimates its own location.

The second phase of the passive location ranging measurement sequence, after the passive location ranging polling phase, is called the passive location ranging measurement sounding phase. The passive location ranging measurement sounding phase includes one or more passive location sounding subvariant ranging trigger frame and ranging NDP exchanges, a ranging NDPA frame, and ranging NDP transmissions. The TF that the RSTA send is of variant ranging and subvariant passive location sounding. The TF here only allocates uplink resources to a single STA.

Similar to in TB Ranging, an ISTA participating in a passive location ranging exchange may measure the TOD of its own ranging NDP and the TOA of when it receives the RSTA's ranging NDP. In addition, the ISTA may also measure and report the TOAs of when it receives the ranging NDPs transmitted by the other ISTAs participating in the passive location ranging exchange. By reporting the TOA timestamps for when it received the other ISTA's NDP transmissions, the quality of the location estimate for a PSTA listening in to the passive location exchanges can be improved.

The last phase of the passive location ranging measurement sequence is the passive location ranging measurement reporting phase and is transmitted short inter-frame spacing (SIFS) time after the passive location ranging measurement sounding phase. In the passive location ranging measurement reporting phase, the RSTA may send an LMR frame and the LMR subvariant ranging trigger to one or more ISTAs that sent an ranging NDP in the preceding passive location ranging measurement sounding phase. An ISTA addressed by the LMR subvariant ranging TF may transmit an ISTA passive LMR frame SIFS time after the LMR subvariant ranging TF transmission.

The ISTA passive LMR frame contains an ISTA passive LMR element containing the TOD time stamp for the I2R NDP that the ISTA transmitted, the TOA time stamp of the R2I NDP that the ISTA received from the RSTA, the CFO of the ISTA with respect to the RSTA, and optionally the TOAs for I2R NDPs received from other ISTAs participating in the passive location ranging polling-sounding-reporting triplet identified by a dialog token included in the report. The ISTA passive LMR frame may include an entry for the ISTA's I2R NDP TOD. The RSTA may send two RSTA broadcast passive LMR frames a SIFS time after receiving the ISTA passive LMR frames from the ISTAs.

The primus RSTA broadcast passive LMR frame containing the following is transmitted first: current passive location LCI table number, passive location LCI table countdown, RSTA passive location LMR and passive location LCI table.

Figure 16:
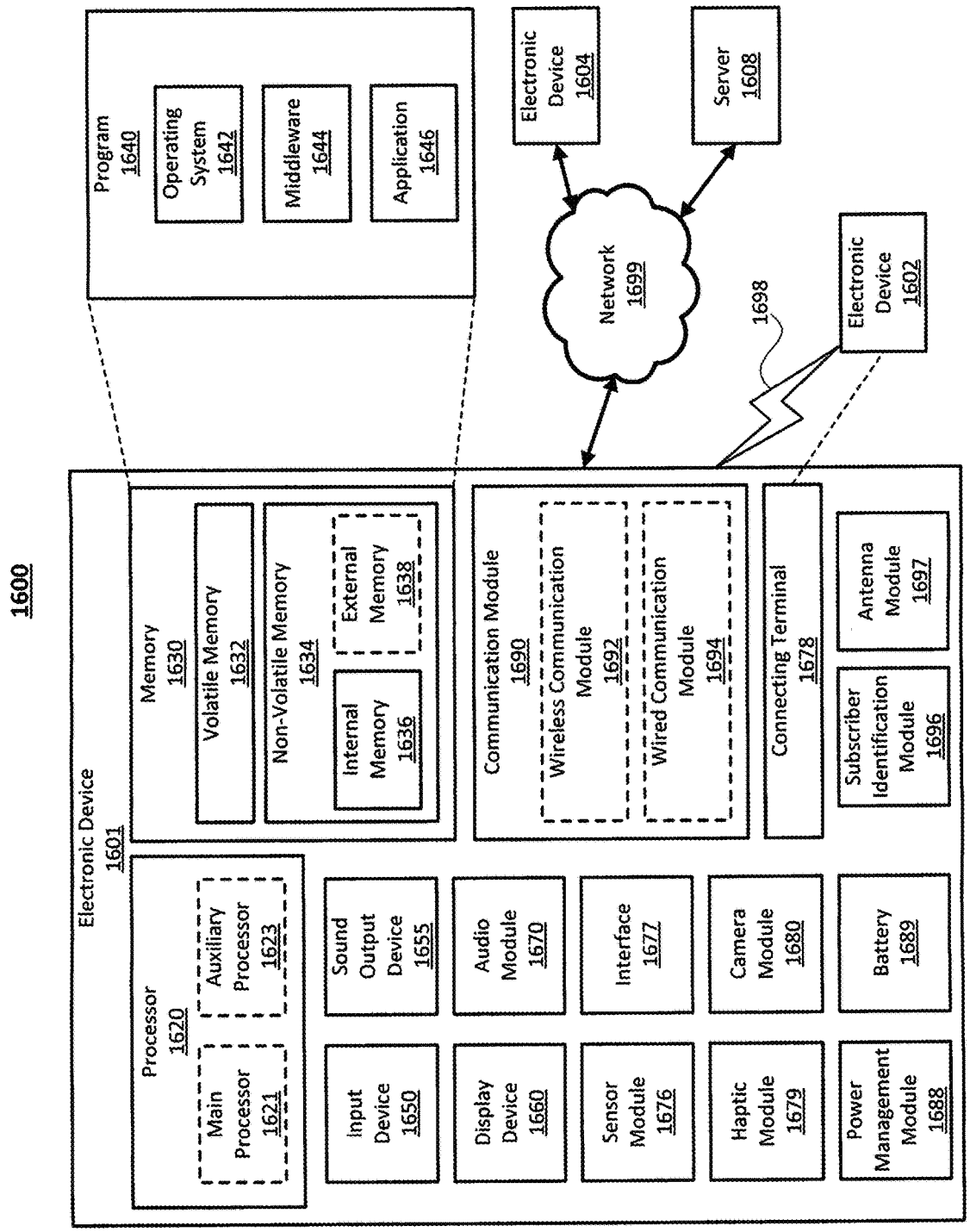
FIG. 16 illustrates a block diagram of an electronic device in a network environment, according to one embodiment.

FIG. 16 illustrates a block diagram of an electronic device 1601 in a network environment 1600, according to one embodiment. Referring to FIG. 16, the electronic device 1601 in the network environment 1600 may communicate with an electronic device 1602 via a first network 1698 (e.g., a short-range wireless communication network), or an electronic device 1604 or a server 1608 via a second network 1699 (e.g., a long-range wireless communication network). The electronic device 1601 may communicate with the electronic device 1604 via the server 1608. The electronic device 1601 may include a processor 1620, a memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) 1696, or an antenna module 1697. In one embodiment, at least one (e.g., the display device 1660 or the camera module 1680) of the components may be omitted from the electronic device 1601, or one or more other components may be added to the electronic device 1601. In one embodiment, some of the components may be implemented as a single integrated circuit (IC). For example, the sensor module 1676 (e.g., a fingerprint sensor, an iris sensor, or an illuminance sensor) may be embedded in the display device 1660 (e.g., a display).

The processor 1620 may execute, for example, software (e.g., a program 1640) to control at least one other component (e.g., a hardware or a software component) of the electronic device 1601 coupled with the processor 1620, and may perform various data processing or computations. As at least part of the data processing or computations, the processor 1620 may load a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or execute a particular function. The auxiliary processor 1623 may be implemented as being separate from, or a part of, the main processor 1621.

The auxiliary processor 1623 may control at least some of the functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to one embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input device 1650 may receive a command or data to be used by other component (e.g., the processor 1620) of the electronic device 1601, from the outside (e.g., a user) of the electronic device 1601. The input device 1650 may include, for example, a microphone, a mouse, or a keyboard.

The sound output device 1655 may output sound signals to the outside of the electronic device 1601. The sound output device 1655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. According to one embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to one embodiment, the audio module 1670 may obtain the sound via the input device 1650, or output the sound via the sound output device 1655 or a headphone of an external electronic device 1602 directly (e.g., wired) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. The sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device 1602 directly (e.g., wired) or wirelessly. According to one embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device 1602. According to one embodiment, the connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or an electrical stimulus which may be recognized by a user via tactile sensation or kinesthetic sensation. According to one embodiment, the haptic module 1679 may include, for example, a motor, a piezoelectric element, or an electrical stimulator.

The camera module 1680 may capture a still image or moving images. According to one embodiment, the camera module 1680 may include one or more lenses, image sensors, image signal processors, or flashes.

The power management module 1688 may manage power supplied to the electronic device 1601. The power management module 1688 may be implemented as at least part of, for example, a power management integrated circuit (PMIC).

The battery 1689 may supply power to at least one component of the electronic device 1601. According to one embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the AP) and supports a direct (e.g., wired) communication or a wireless communication. According to one embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or a standard of the Infrared Data Association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to one embodiment, the antenna module 1697 may include one or more antennas, and, therefrom, at least one antenna appropriate for a communication scheme used in the communication network, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. All or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

One embodiment may be implemented as software (e.g., the program 1640) including one or more instructions that are stored in a storage medium (e.g., internal memory 1636 or external memory 1638) that is readable by a machine (e.g., the electronic device 1601). For example, a processor of the electronic device 1601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
    measuring, by a responder station (RSTA), a first phase shift time of arrival (PS-TOA) based on a first packet received from an initiator station (ISTA);
    reporting, by the RSTA, the first PS-TOA to the ISTA;
    receiving, from the ISTA, a second PS-TOA based on a second packet sent from the RSTA to the ISTA;
    determining, at the RSTA, a corrected first PS-TOA from the first PS-TOA;
    broadcasting, by the RSTA, time stamps of the corrected first PS-TOA and a time of departure (TOD) of the second packet;
    wherein a passive station (PSTA) determines times when the first packet and the second packet are received at the PSTA; and
    wherein the PSTA, determines a differential distance between a first distance and a second distance, where the first distance is a distance between the PSTA and the RSTA, and the second distance is a distance between the PSTA and the ISTA, where the differential distance is determined based on the times when the first packet and the second packet are received by the PSTA, and the broadcasted time stamps of the corrected first PS-TOA and the TOD of the second packet.

2. The method of claim 1, wherein the first packet comprises a received uplink (UL) null data packet (NDP).

3. The method of claim 1, wherein the second packet comprises a received downlink (DL) null data packet (NDP).

4. The method of claim 1, wherein the RSTA reports the first PS-TOA of the RSTA in a location measurement report (LMR) frame of the RSTA.

5. The method of claim 4, wherein the RSTA reports a measured TOA of the first packet in the LMR frame of the RSTA.

6. The method of claim 1, wherein the differential distance comprises a differential time-of-flight.

7. A responder station (RSTA), comprising:
one or more processors configured to:
- measure a first phase shift time of arrival (PS-TOA) based on a first packet received from an initiator station (ISTA);
- report the first PS-TOA to the ISTA;
- receive, from the ISTA, a second PS-TOA based on a second packet sent from the RSTA to the ISTA;
- determine a corrected first PS-TOA from the first PS-TOA; and
- broadcast time stamps of the corrected first PS-TOA and a time of departure (TOD) of the second packet;
- wherein a passive station (PSTA) determines times when the first packet and the second packet are received at the PSTA, and
wherein the PSTA, determines a differential distance between a first distance and a second distance, where the first distance is a distance between the PSTA and the RSTA, and the second distance is a distance between the PSTA and the ISTA, where the differential distance is determined based on the times when the first packet and the second packet are received by the PSTA, and the broadcasted time stamps of the corrected first PS-TOA and the TOD of the second packet.

8. The RSTA of claim 7, wherein the first packet comprises a received uplink (UL) null data packet (NDP).

9. The RSTA of claim 7, wherein the second packet comprises a received downlink (DL) null data packet (NDP).

10. The RSTA of claim 7, wherein the RSTA reports the first PS-TOA of the RSTA in a location measurement report (LMR) frame of the RSTA.

11. The RSTA of claim 10, wherein the RSTA reports a measured TOA of the first packet in the LMR frame of the RSTA.

12. The RSTA of claim 7, wherein the differential distance comprises a differential time-of-flight.

13. A system, comprising:
- a responder station (RSTA) comprising a processor configured to measure a first phase shift time of arrival (PS-TOA) based on a first packet received from an initiator station (ISTA), report the first PS-TOA to the ISTA, and broadcast time stamps of a corrected first PS-TOA and a time of departure (TOD) of a second packet;
- the ISTA comprising a processor configured to measure a second PS-TOA based on the second packet received from the RSTA, and report the second PS-TOA to the RSTA, wherein the RSTA and ISTA are configured as a pair;
- a passive station (PSTA) comprising a processor configured to determine times when the first packet and the second packet are received at the PSTA, and determine a differential distance between a first distance and a second distance, where the first distance is a distance between the PSTA and the RSTA, and the second distance is a distance between the PSTA and the ISTA, where the differential distance is determined based on the times when the first packet and the second packet are received, and the broadcasted time stamps.

* * * * *